(12) United States Patent
Mugiraneza et al.

(10) Patent No.: US 10,795,522 B2
(45) Date of Patent: Oct. 6, 2020

(54) TOUCH PANEL AND TOUCH PANEL SYSTEM

(71) Applicant: Sharp Kabushiki Kaisha, Sakai, Osaka (JP)

(72) Inventors: Jean Mugiraneza, Sakai (JP); Ryo Yonebayashi, Sakai (JP); Miho Yamada, Sakai (JP); Tomohiro Kimura, Sakai (JP); Yasuhiro Sugita, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 16/339,009

(22) PCT Filed: Oct. 6, 2017

(86) PCT No.: PCT/JP2017/036425
§ 371 (c)(1),
(2) Date: Apr. 3, 2019

(87) PCT Pub. No.: WO2018/066685
PCT Pub. Date: Apr. 12, 2018

(65) Prior Publication Data
US 2020/0042118 A1    Feb. 6, 2020

(30) Foreign Application Priority Data

Oct. 6, 2016  (JP) ................................ 2016-198480

(51) Int. Cl.
*G06F 3/044*    (2006.01)
*G06F 3/046*    (2006.01)

(52) U.S. Cl.
CPC .............. *G06F 3/044* (2013.01); *G06F 3/046* (2013.01); *G06F 2203/04106* (2013.01); *G06F 2203/04114* (2019.05)

(58) Field of Classification Search
CPC .......... G06F 3/044; G06F 3/046; G06F 3/041; G06F 2203/04106; G06F 2203/04114
See application file for complete search history.

(56) References Cited

U.S. PATENT DOCUMENTS

| | | | |
|---|---|---|---|
| 2008/0238885 A1* | 10/2008 | Zachut | G06F 3/046 345/174 |
| 2009/0231299 A1 | 9/2009 | Shi | |
| 2014/0078104 A1 | 3/2014 | Lee et al. | |
| 2016/0306489 A1* | 10/2016 | Mizuhashi | G06F 3/046 |
| 2016/0349915 A1* | 12/2016 | Sekizawa | G06F 3/04886 |
| 2019/0196639 A1* | 6/2019 | Mugiraneza | G06F 3/044 |

FOREIGN PATENT DOCUMENTS

JP      2014-164770 A      9/2014

OTHER PUBLICATIONS

Official Communication issued in International Patent Application No. PCT/JP2017/036425, dated Nov. 7, 2017.

* cited by examiner

*Primary Examiner* — Liliana Cerullo
(74) *Attorney, Agent, or Firm* — Keating & Bennett, LLP

(57) ABSTRACT

Proximity of a coil is recognized without increasing a material cost or a manufacturing cost. Provided is a touch panel (1) that includes a plurality of drive electrodes (4) that are formed in a drive layer (2) and a plurality of touch sense electrodes (5) that are formed in a sense layer (3), in which a proximity sense electrode (7) by which proximity of a coil is detected is formed in the sense layer (3).

22 Claims, 17 Drawing Sheets

TOUCH PANEL AND TOUCH PANEL SYSTEM

TECHNICAL FIELD

The present invention relates to a touch panel and a touch panel system that are able to detect a touch position and detect proximity of a coil.

BACKGROUND ART

A display apparatus that is able to detect proximity of a coil has been known as a related art (PTL 1). In a touch control display screen disclosed in PTL 1, an induction layer of wire lattice is attached on the rear of the display screen. The wire lattice of the induction layer is composed of wires formed along an X axis direction and wires formed along a Y axis direction, and constitutes an electromagnetic induction antenna array to recognize proximity of an induction element such as a coil.

CITATION LIST

Patent Literature

PTL 1: U.S. Patent Application Publication No. 2009/0231299 (published on Sep. 17, 2009)

SUMMARY OF INVENTION

Technical Problem

However, the related art described above has a configuration in which the induction layer of the wire lattice is provided on the rear of the display screen and therefore requires newly adding a member for recognizing proximity of the coil. Thus, there is a problem that a material cost and a manufacturing cost increase for recognizing the proximity of the coil.

The invention is made in view of the aforementioned problem and an object thereof is to realize a touch panel and a touch panel system that are able to recognize proximity of a coil without increasing the material cost or the manufacturing cost.

Solution to Problem

In order to solve the aforementioned problem, a touch panel according to an aspect of the invention is a touch panel that includes: a plurality of drive electrodes that are formed in a drive layer along a first direction; and a plurality of touch sense electrodes that are formed in a sense layer, which is insulated from the drive layer, along a second direction crossing the drive electrodes, in which a proximity sense electrode by which proximity of a coil is detected is formed in the sense layer.

In order to solve the aforementioned problem, a touch panel system according to an aspect of the invention is a touch panel system that includes: the touch panel according to the aspect of the invention and a controller that controls the touch panel, in which the controller includes: a drive circuit that applies drive voltages to the plurality of drive electrodes for a touch detection period in which a touch to the touch panel is detected and that applies coil detection voltages to the plurality of drive electrodes for a coil detection period in which proximity of the coil is detected; and a detection circuit that detects a touch position for the touch detection period by reading out, along the plurality of touch sense electrodes, linear sum signals which are based on the drive voltages applied to the drive electrodes and are originated from charges of a plurality of capacitors, and that detects proximity of the coil for the coil detection period by reading out, along the plurality of touch sense electrodes, linear sum signals which are based on the coil detection voltages applied to the drive electrodes, are originated from charges of the plurality of capacitors, and are affected by a change of a coupled charge between the proximity sense electrode and corresponding one of the touch sense electrodes due to the proximity of the coil, and a frequency modulator that receives, from the proximity sense electrode, a signal based on a resonance frequency of the coil, modulates a frequency of the signal, and supplies the resultant to an RFID transmitter/receiver or the controller is further included.

Advantageous Effects of Invention

According to an aspect of the invention, an effect is exerted in that a touch panel and a touch panel system that are able to recognize proximity of a coil without increasing a material cost or a manufacturing cost are able to be realized.

DESCRIPTION OF EMBODIMENTS

Hereinafter, Embodiments of the invention will be described in detail.

Embodiment 1

(Configuration of Touch Panel 1)

Figure 1:
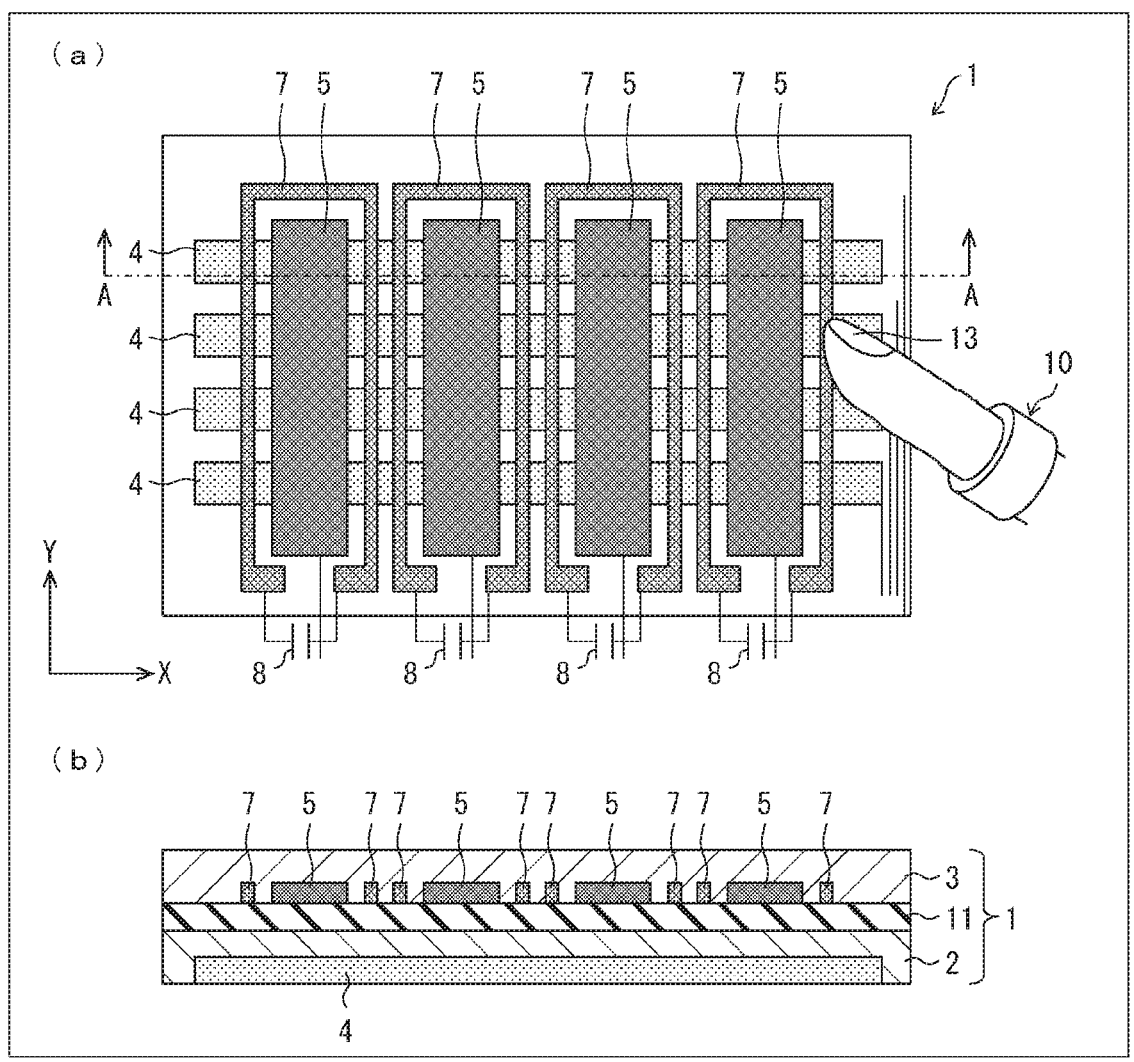
FIG. 1(a) is a front view illustrating a configuration of a touch panel according to Embodiment 1 and FIG. 1(b) is a sectional view taken along a plane AA illustrated in FIG. 1(a).

FIG. 1(a) is a front view illustrating a configuration of a touch panel 1 according to Embodiment 1 and FIG. 1(b) is a sectional view taken along a plane AA illustrated in FIG. 1(a). As illustrated in FIG. 1(b), the touch panel 1 has a drive layer 2, a sense layer 3, and an insulation layer 11 that is formed between the drive layer 2 and the sense layer 3. As illustrated in FIGS. 1(a) and 1(b), the touch panel 1 includes a plurality of drive electrodes 4 which are formed in the drive layer 2 in parallel to each other along an X direction (first direction), a plurality of touch sense electrodes 5 that are formed in the sense layer 3 in parallel to each other along a Y direction (second direction), and a plurality of capacitors (not illustrated) formed between the plurality of drive electrodes 4 and the plurality of touch sense electrodes 5.

FIG. 1(a) illustrates an example in which the touch sense electrodes 5 are formed in a direction orthogonal to the drive electrodes 4, but the invention is not limited thereto as long as the touch sense electrodes 5 are formed in a direction crossing the drive electrodes 4.

In order to detect a touch to the touch panel 1, drive voltages are applied to the plurality of drive electrodes 4. Then, linear sum signals which are based on the drive voltages applied to the drive electrodes 4 and are originated from electrostatic capacities of the plurality of capacitors are read out along the plurality of touch sense electrodes 5. Next, a touch position is detected on the basis of the linear sum signals read out along the plurality of touch sense electrodes 5.

A plurality of proximity sense electrodes 7 that detect proximity of a coil 10 mounted on a finger 13 are formed in the sense layer 3. Each of the proximity sense electrodes 7 is arranged in a U-shape so as to surround each of the touch sense electrodes 5. In this manner, the plurality of proximity sense electrodes 7 are arranged at positions that correspond to the respective touch sense electrodes 5.

The proximity sense electrode 7 is formed so as to have a resonance frequency of the coil 10. In order to define the resonance frequency of the proximity sense electrode 7, a resonance frequency capacitor 8 that is connected to one end and the other end of the proximity sense electrode 7 is provided. The resonance frequency capacitor 8 is preferably arranged in the sense layer 3, but may be arranged at a place other than the sense layer 3, for example, in the drive layer 2.

The proximity sense electrode 7 is preferably made from transparent ITO (Indium Tin Oxide).

An electrostatic capacitive touch panel is a general user interface in an electronic appliance, such as a smartphone, a tablet PC, or another portable medium, which is applied to various touch applications (software). Moreover, the touch panel is also commonly used in another electronic appliance such as a vending machine or a home electric appliance. In recent years, Internet of Things by which different apparatuses are connected has been widespread, and eventually, it becomes necessary for an apparatus itself to be connected through the touch panel.

However, an electrostatic capacitive touch panel of the related art is able to detect only a touch. The electrostatic capacitive touch panel of the related art is difficult to identify a type of an object performing the touch. That is, the electrostatic capacitive touch panel of the related art is difficult to identify whether the object performing the touch is metal, a finger of a human, or another apparatus. For example, when two of a user A and a user B touch a display, the touch panel of the related art is difficult to identify whether a finger performing the touch is a finger of the user A or a finger of the user B.

In the present embodiment, a group of a pair of sense electrodes (the proximity sense electrode 7 and the touch sense electrode 5) is arranged in the sense layer 3. One (the proximity sense electrode 7 (an outer electrode)) of the pair of sense electrodes electrically forms a loop or an LC circuit. The proximity sense electrode 7 that forms the electric loop is preferably formed so as to surround a periphery of the other (the touch sense electrode 5 (an inner electrode)) of the pair of sense electrodes. The proximity sense electrode 7 that forms the electric loop resonates at a frequency higher than a frequency of the touch panel (for example, an RF frequency), and enables RFID (Radio Frequency IDentifier) coupling or sweep frequency detection identification. A signal having the aforementioned high frequency is modulated by a touch panel signal.

(Operations of Proximity Sense Electrode 7 and Touch Sense Electrode 5)

Figure 2:
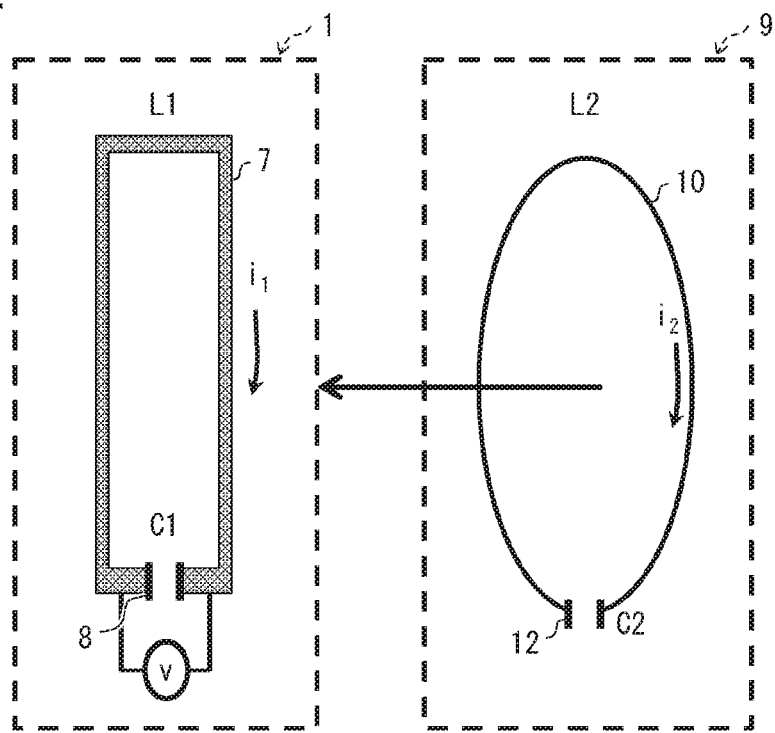
FIG. 2 is a schematic view for explaining an operation of a proximity sense electrode that is provided in the touch panel.
Figure 3:
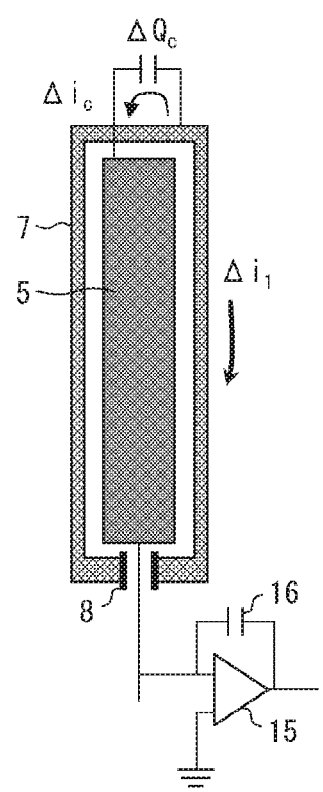
FIG. 3 is a schematic view for explaining operations of the proximity sense electrode and a touch sense electrode that are provided in the touch panel.

FIG. 2 is a schematic view for explaining an operation of the proximity sense electrode 7 that is provided in the touch panel 1. FIG. 3 is a schematic view for explaining operations of the proximity sense electrode 7 and the touch sense electrode 5 that are provided in the touch panel 1.

When an RFID apparatus 9 which has the coil 10 with the resonance frequency of the proximity sense electrode 7 that forms the electric loop and which brings high frequency radiation comes close to the touch panel 1, a magnetic flux in the proximity sense electrode 7 changes. As a result, an induced electromotive force is generated. Thereby, a change of a coupled charge occurs inside the proximity sense electrode 7. A change $\Delta Q_c$ of the coupled charge between the proximity sense electrode 7 and the touch sense electrode 5 is detected by a touch panel controller that controls the touch panel 1. Accordingly, a position of the RFID apparatus 9, which brings the high frequency radiation, on the touch panel 1 is detected and the RFID apparatus 9 and a user thereof are easily identified.

A signal for identifying the user is generated by using the touch panel controller. When the RFID apparatus 9 having the coil 10 comes close to the touch panel 1, mutual inductance occurs between the RFID apparatus 9 and the proximity sense electrode 7. A change of induced current causes a change in a charge flowing from the proximity sense electrode 7 to the touch sense electrode 5. In the proximity sense electrode 7 that forms the electric loop, resonance occurs, and the change $\Delta Q_c$ of the coupled capacity between the proximity sense electrode 7 and the touch sense electrode 5 is induced.

Inductance of the proximity sense electrode 7 increases by the loop shape thereof. The proximity sense electrode 7 is further coupled with an electrostatic capacity so as to match with a predetermined resonance frequency.

As a result of the inductive coupling of the proximity sense electrode 7 having the loop shape and the coil 10 of the RFID apparatus 9, which is accompanied by an alternating signal, a magnetic flux flowing through the coil 10 and the proximity sense electrode 7 changes. Thereby, as indicated by the following (formula 1) to (formula 3), emf is induced and a self-inductance voltage changes.

[Mathematical formula 1]

$$emf = v = \frac{d\Phi}{dt} \quad \text{(formula 1)}$$

$$v = L_1 \frac{di_1}{dt} - M \frac{di_2}{dt} \quad \text{(formula 2)}$$

$$M = k\sqrt{L_1 L_2} \quad \text{(formula 3)}$$

The proximity sense electrode 7 on the outer side is coupled with the touch sense electrode 5 on the inner side through the electrostatic capacity that is given. A flow of current and a charge in the touch sense electrode 5 on the inner side is changed by the change of the induced current in the proximity sense electrode 7 having the loop shape. Thereby, proximity of the coil 10 is detected.

(Configuration and Operation of Touch Panel System 14)

Figure 4:
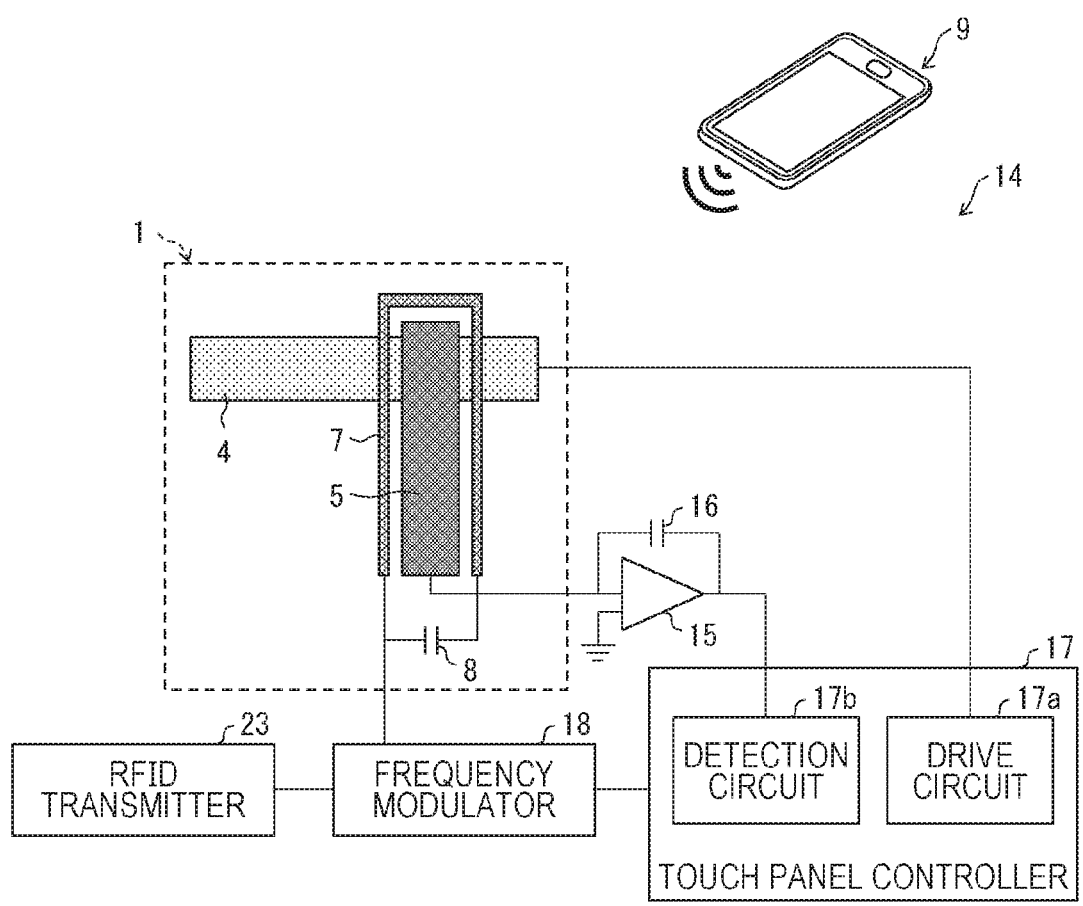
FIG. 4 is a schematic view illustrating a touch panel system provided with the touch panel.
Figure 5:
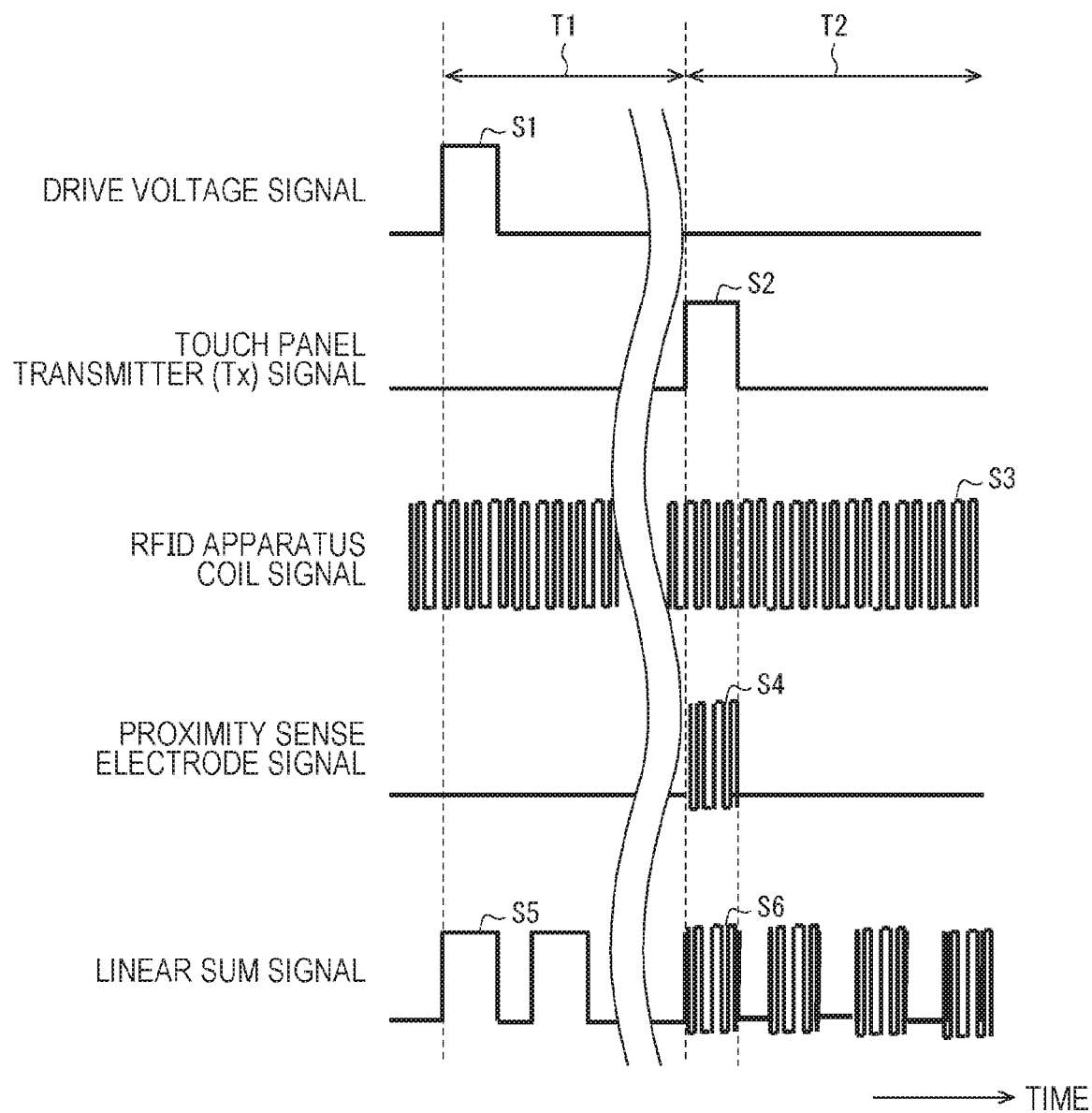
FIG. 5 is a timing chart for explaining an operation of the touch panel system.
Figure 6:
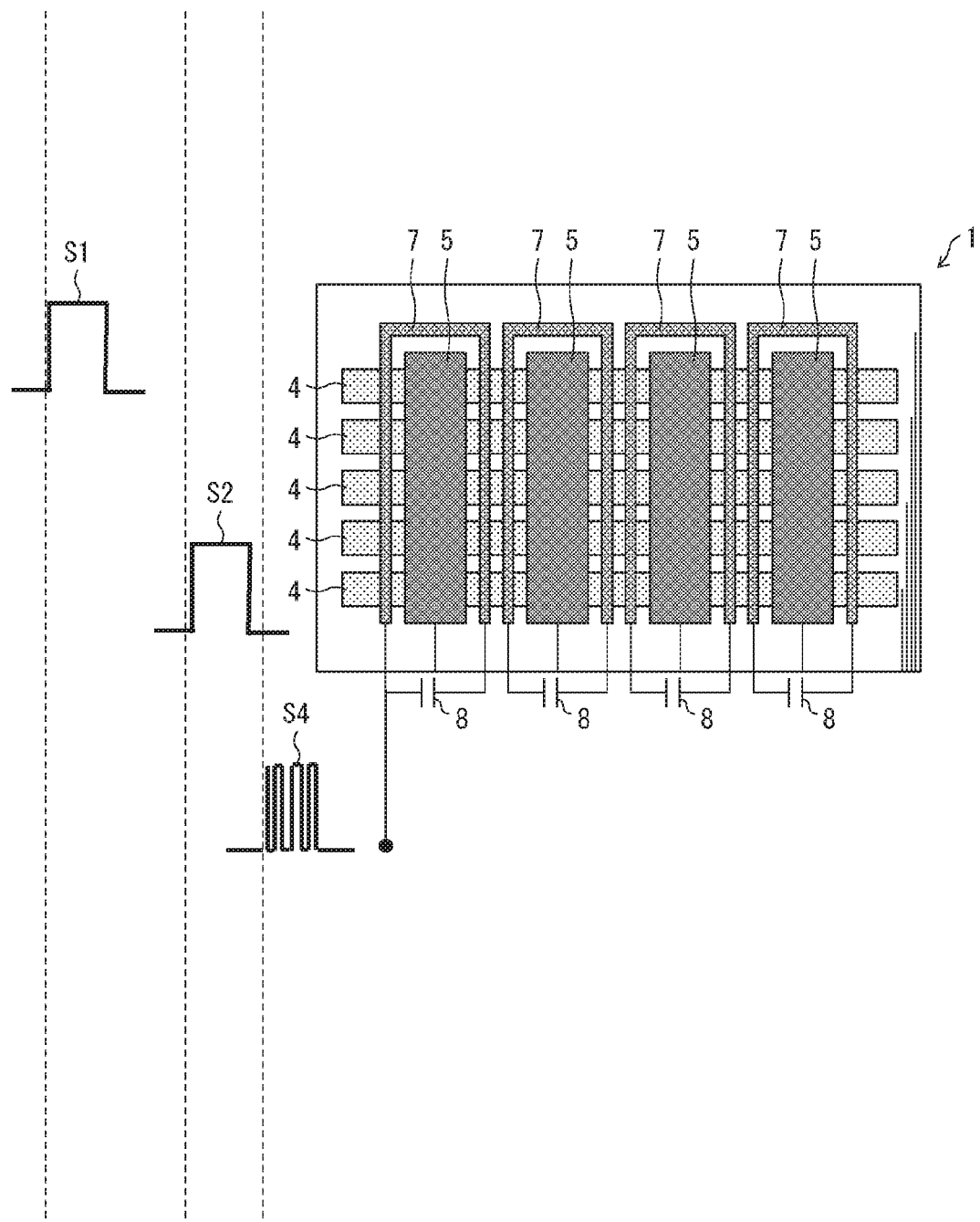
FIG. 6 is a schematic view for explaining an input/output signal of the touch panel.

FIG. 4 is a schematic view illustrating a touch panel system 14 provided with the touch panel 1. FIG. 5 is a timing chart for explaining an operation of the touch panel system 14. FIG. 6 is a schematic view for explaining an input/output signal of the touch panel 1.

The touch panel system 14 includes the touch panel 1 and a touch panel controller 17 (controller) that controls the touch panel 1.

The touch panel controller 17 has a drive circuit 17a that applies drive voltage signals S1 (drive voltages) to the plurality of drive electrodes 4 for a touch detection period T1 in which a touch to the touch panel 1 is detected, and applies touch panel transmitter (Tx) signals S2 (coil detection voltages) to the plurality of drive electrodes 4 for an RFID apparatus detection period T2 in which proximity of the RFID apparatus 9 is detected.

Moreover, the touch panel controller 17 has a detection circuit 17b that detects a touch position by reading out, along the plurality of touch sense electrodes 5, linear sum signals S5 which are based on the drive voltage signals S1 applied to the drive electrodes 4 for the touch detection period T1 and are originated from charges of the plurality of capacitors and that detects proximity of the RFID apparatus 9 by reading out, along the plurality of touch sense electrodes 5, liner sum signals S6 which are based on the touch panel transmitter signals S2 applied to the drive electrodes 4 for the RFID apparatus detection period T2, are originated from charges of the plurality of capacitors, and are affected by a change of a coupled charge between the touch sense electrode 5 and the proximity sense electrode 7 in which a proximity sense electrode signal S4 flows due to the proximity of the RFID apparatus 9.

In the touch panel system 14, amplifiers 15 that are connected to the respective touch sense electrodes 5 are provided. An integral capacity 16 is provided in each of the amplifiers 15. The amplifiers 15 amplify the linear sum signals S5 that are read out along the touch sense electrodes 5 for the touch detection period T1, and supplies the resultant to the detection circuit 17b. The amplifiers 15 amplify the linear sum signals S6 that are read out along the touch sense electrodes 5 for the RFID apparatus detection period T2, and supplies the resultant to the detection circuit 17b.

The touch panel system 14 includes a frequency modulator 18 and an RFID transmitter 23. The frequency modulator 18 generates a modulation signal by superposing an RFID signal, which is received from the RFID transmitter 23, on a drive signal with a rectangular wave, which is received from the touch panel controller 17, and supplies the modulation signal to the proximity sense electrode 7.

The touch panel system 14 configured as described above operates as follows.

First, the coil 10 of the RFID apparatus 9 comes close to the proximity sense electrode 7 of the touch panel 1 while radiating a coil signal S3. Then, the drive circuit 17a of the touch panel controller 17 applies the drive voltage signals S1 to the plurality of drive electrodes 4 for the touch detection period T1. Next, the amplifiers 15 read out, along the plurality of touch sense electrodes 5, the linear sum signals S5 which are based on drive voltage signals S1 applied to the drive electrodes 4 and are originated from charges of the plurality of capacitors and amplify the linear sum signals S5, and supply the resultant to the detection circuit 17b of the touch panel controller 17. After that, the detection circuit 17b detects a touch position of an object touching the touch panel 1 on the basis of the linear sum signals S5 supplied from the amplifiers 15.

Then, the drive circuit 17a applies the touch panel transmitter signals S2 to the plurality of drive electrodes 4 for the RFID apparatus detection period T2. Next, the amplifiers 15 read out, along the plurality of touch sense electrodes 5, the linear sum signals S6 which are based on the touch panel transmitter signals S2 applied to the drive electrodes 4, are originated from charges of the plurality of capacitors, and are affected by a change of a coupled charge between the touch sense electrode 5 and the proximity sense electrode 7 in which the proximity sense electrode signal S4 flows due to the proximity of the RFID apparatus 9, and amplifies the linear sum signals S6 and supplies the resultant to the detection circuit 17b of the touch panel controller 17. After that, on the basis of the linear sum signals S6 supplied from the amplifiers 15, the detection circuit 17b detects proximity of the RFID apparatus 9 to the touch panel 1 and a position of the RFID apparatus 9, which is in proximity, on the touch panel 1.

In this manner, the linear sum signals S5 based on a touch of an object, such as a finger, which performs the touch, and the linear sum signals S6 based on proximity of the RFID apparatus 9 are read out from the touch sense electrodes 5. When the RFID apparatus 9 comes close to the touch panel 1, the touch panel controller 17 detects the proximity of the RFID apparatus 9 to the touch panel 1 and the position of the RFID apparatus 9, which is in proximity, on the touch panel 1.

Figure 7:
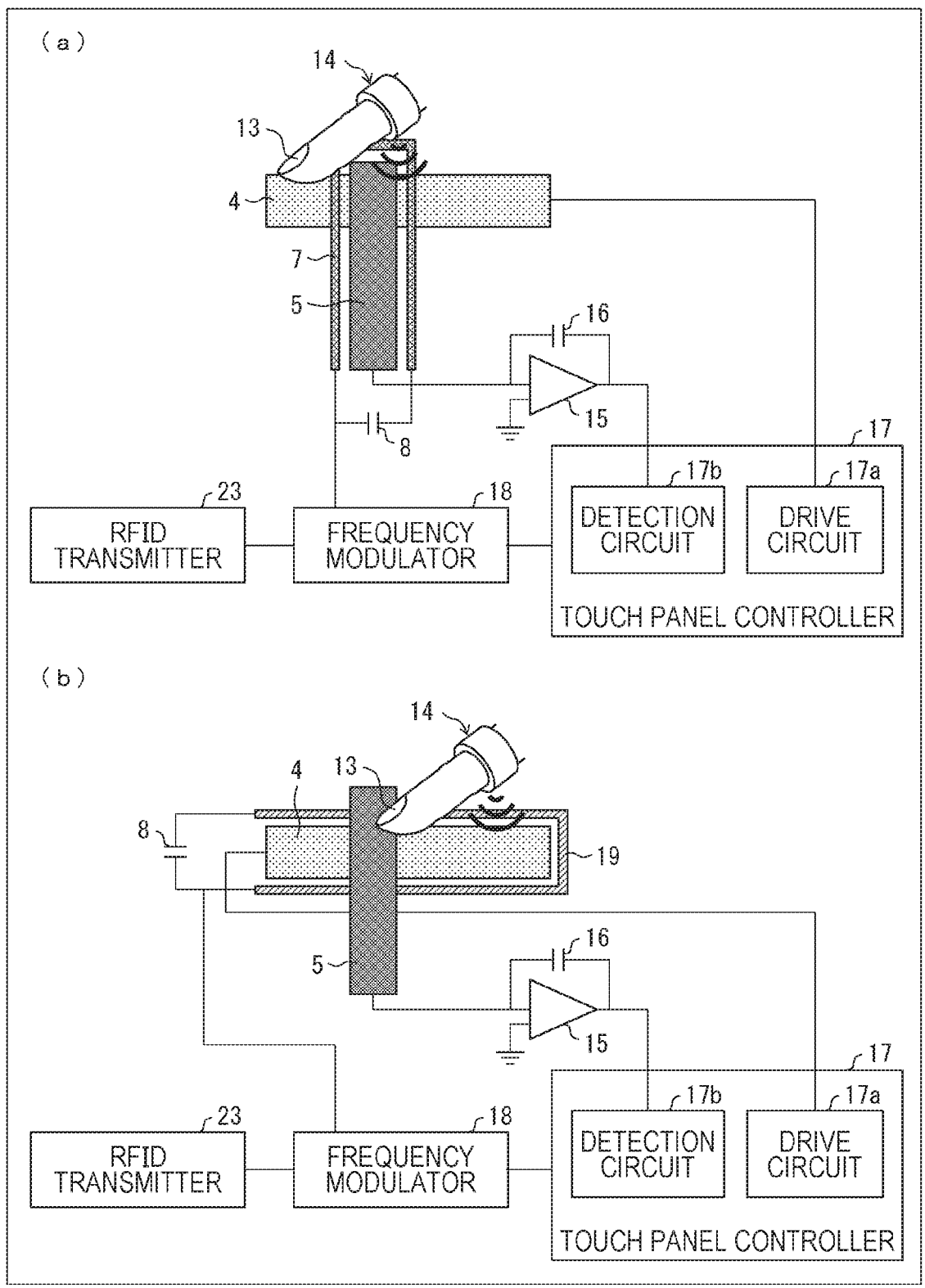
FIG. 7(a) is a schematic view for explaining an operation of the proximity sense electrode that is arranged so as to surround the touch sense electrode that is provided in the touch panel and FIG. 7(b) is a schematic view for explaining an operation of a drive layer proximity sense electrode that is arranged so as to surround a drive electrode that is provided in the touch panel.
Figure 8:
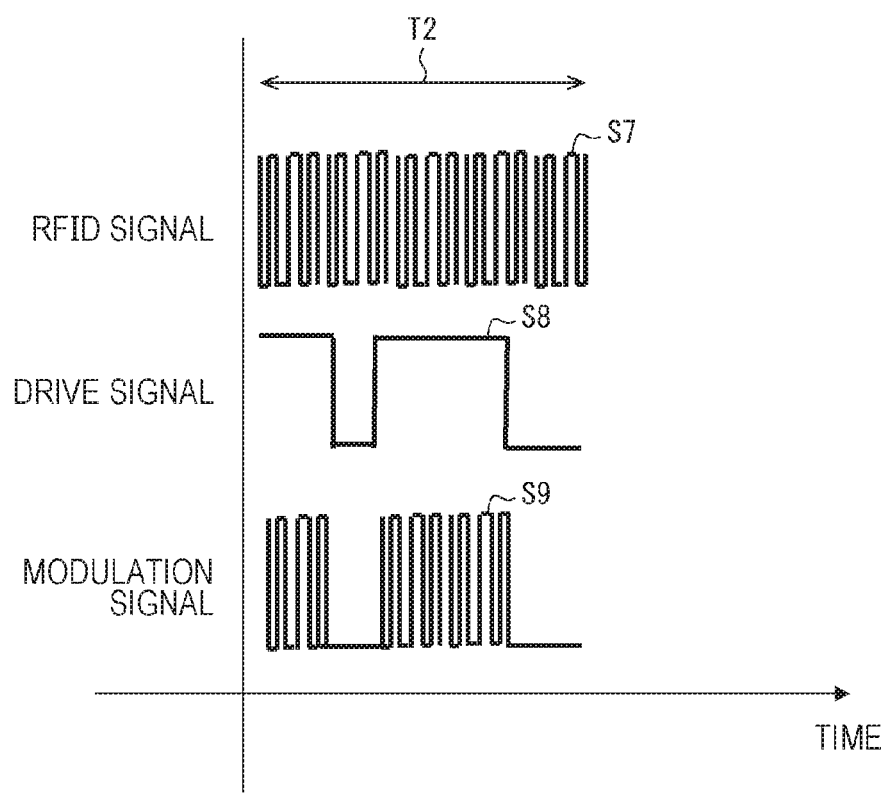
FIG. 8 is a timing chart for explaining operations of the proximity sense electrode and the drive layer proximity sense electrode.
Figure 9:
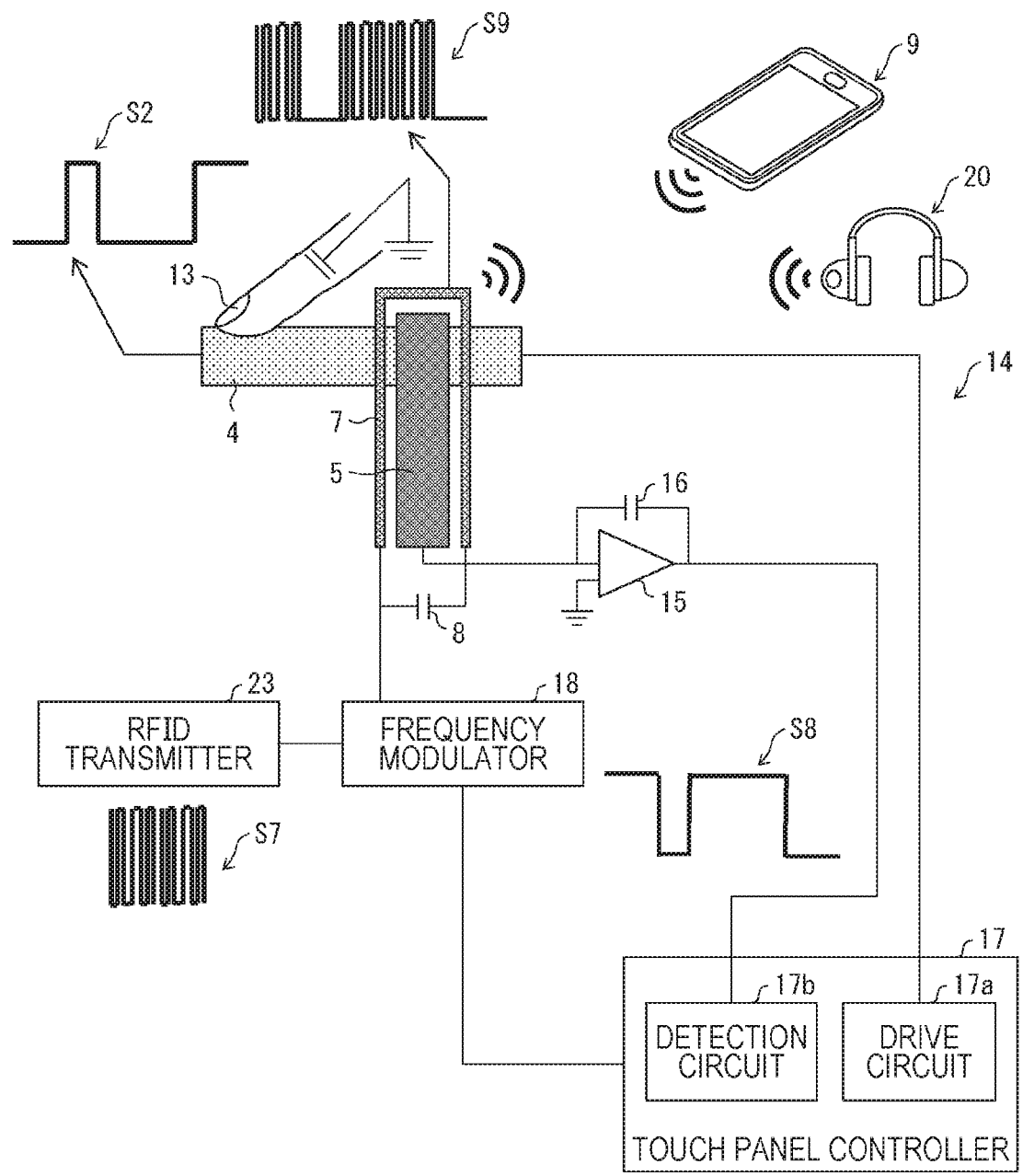
FIG. 9 is a schematic view for explaining an operation of the touch panel system.

FIG. 7(*a*) is a schematic view for explaining an operation of the proximity sense electrode 7 that is arranged so as to surround the touch sense electrode 5 that is provided in the touch panel 1 and FIG. 7(*b*) is a schematic view for explaining an operation of a drive layer proximity sense electrode 19 that is arranged so as to surround the drive electrode 4 that is provided in the touch panel 1. FIG. 8 is a timing chart for explaining operations of the proximity sense electrode 7 and the drive layer proximity sense electrode 19. FIG. 9 is a schematic view for explaining an operation of the touch panel system 14.

With reference to FIG. 7(a), the proximity sense electrode 7 arranged in a U-shape so as to surround the touch sense electrode 5 is connected to the frequency modulator 18. The frequency modulator 18 is connected to the RFID transmitter 23 and the touch panel controller 17.

The touch panel controller 17 has the drive circuit 17a that applies the drive voltage signal S1 to the drive electrode 4 for the touch detection period T1, and applies the touch panel transmitter signal S2 to the drive electrode 4 for the RFID apparatus detection period T2.

The touch panel controller 17 has the detection circuit 17b that detects a touch position by reading out, along the touch sense electrode 5, the linear sum signal S5 which is based on the drive voltage signal S1 applied to the drive electrode 4 for the touch detection period T1 and is originated from charges of the plurality of capacitors, and that detects proximity of the RFID apparatus 9 on the basis of the linear sum signal S6 that is supplied from the amplifier 15 that reads out, along the touch sense electrode 5, the linear sum signal S6 which is based on the touch panel transmitter signal S2 applied to the drive electrode 4 for the RFID apparatus detection period T2, is originated from charges of the plurality of capacitors, and is affected by a change of a coupled charge between the proximity sense electrode 7 and the touch sense electrode 5 due to the proximity of the RFID apparatus 9.

With reference to FIGS. 7(a) and 8, the RFID transmitter 23 generates an RFID signal S7 on the order of megahertz for the RFID apparatus detection period T2 and supplies the RFID signal S7 to the frequency modulator 18. The touch panel controller 17 generates a drive signal S8 with a rectangular wave around 100 kHz and supplies the resultant to the frequency modulator 18. The frequency modulator 18 generates a modulation signal S9 by superposing the RFID signal S7, which is supplied from the RFID transmitter 23, on the drive signal S8 which is supplied from the touch panel controller 17 and supplies the modulation signal S9 to the proximity sense electrode 7.

With reference to FIG. 7(b), the drive layer proximity sense electrode 19 arranged in a U-shape so as to surround the drive electrode 4 is connected to the frequency modulator 18. The frequency modulator 18 is connected to the RFID transmitter 23 and the touch panel controller 17.

The touch panel controller 17 has the drive circuit 17a and the detection circuit 17b.

With reference to FIGS. 7(b) and 8, the frequency modulator 18 generates the modulation signal S9 by superposing the RFID signal S7, which is supplied from the RFID transmitter 23, on the drive signal S8 which is supplied from the touch panel controller 17 and supplies the modulation signal S9 to the drive layer proximity sense electrode 19.

With reference to FIG. 9, the proximity sense electrode 7 arranged in a U-shape so as to surround each of the touch sense electrodes 5 is connected to the frequency modulator 18. The frequency modulator 18 is connected to an RFID transmitter 23 and the touch panel controller 17.

The touch panel controller 17 has the drive circuit 17a and the detection circuit 17b.

With reference to FIGS. 5, 8, and 9, the drive circuit 17a of the touch panel controller 17 applies the touch panel transmitter signal S2 to the drive electrode 4 for the RFID apparatus detection period T2. The RFID transmitter 23 generates the RFID signal S7 on the order of megahertz and supplies the RFID signal S7 to the frequency modulator 18. The touch panel controller 17 generates the drive signal S8 with a rectangular wave around 100 kHz and supplies the drive signal S8 to the frequency modulator 18. The frequency modulator 18 generates the modulation signal S9 by superposing the RFID signal S7, which is supplied from the RFID transmitter 23, on the drive signal S8 which is supplied from the touch panel controller 17 and supplies the modulation signal S9 to the proximity sense electrode 7.

Embodiment 2

Another embodiment of the invention will be described as follows with reference to FIGS. 10 and 11. Note that, for convenience of description, a member having the same function as that of the member described in the aforementioned embodiment will be given the same reference sign and description thereof will be omitted.

Figure 10:
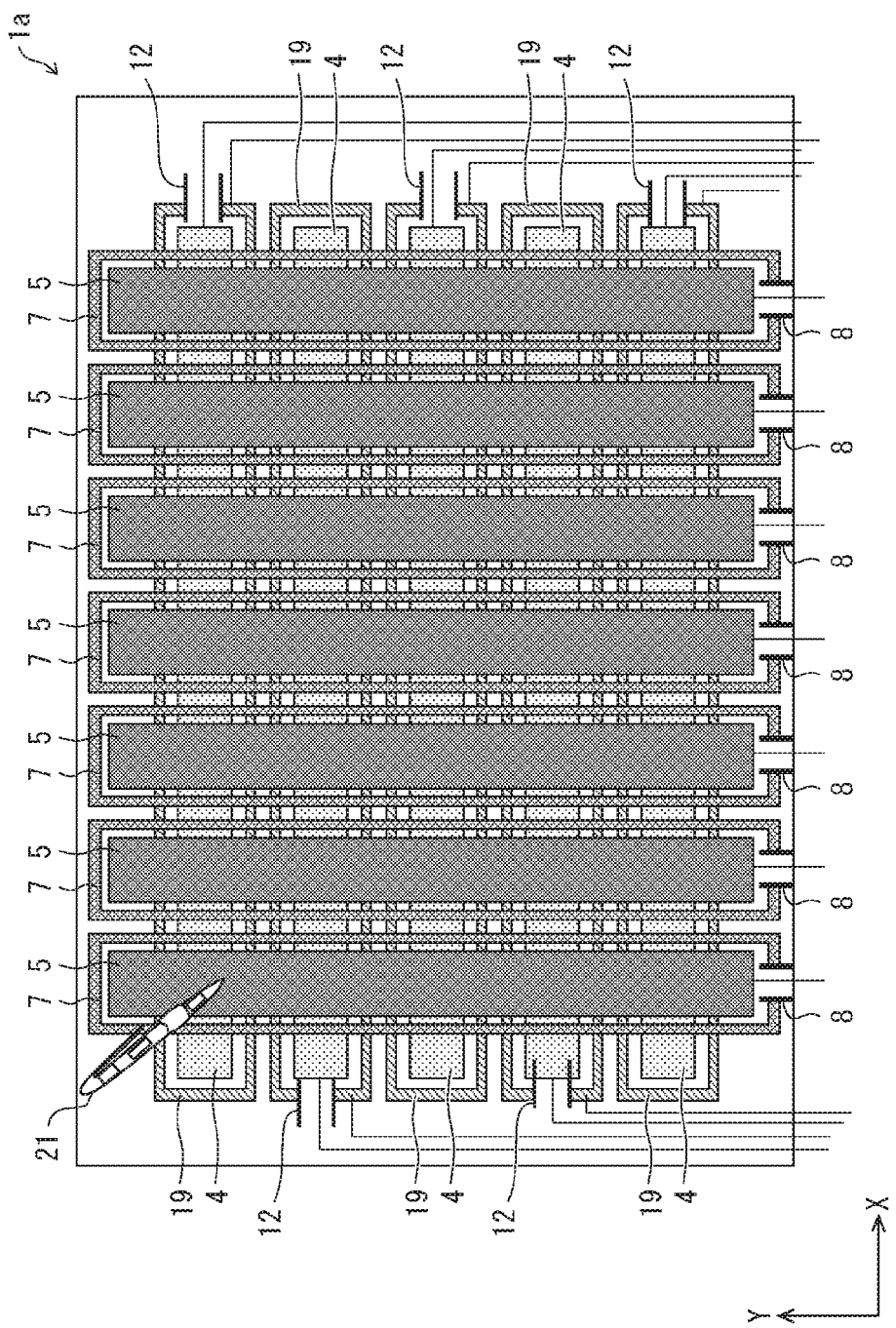
FIG. 10 is a front view illustrating a configuration of a touch panel according to Embodiment 2.

FIG. 10 is a front view illustrating a configuration of a touch panel 1a according to Embodiment 2. In order to detect proximity of the coil 10, each of a plurality of drive layer proximity sense electrodes 19 having the resonance frequency of the coil 10 may be formed in a U-shape in the drive layer 2 so as to surround each of the drive electrodes 4.

In order to define the resonance frequency of the drive layer proximity sense electrode 19, a resonance frequency capacitor 12 that is connected to one end and the other end of the drive layer proximity sense electrode 19 is provided. In the example illustrated in FIG. 10, resonance frequency capacitors 12 corresponding to drive layer proximity sense electrodes 19 at odd-numbered positions from the top are arranged at right ends, and resonance frequency capacitors 12 corresponding to drive layer proximity sense electrodes 19 at even-numbered positions are arranged at left ends. In such a manner, the plurality of drive layer proximity sense electrodes 19 are arranged at positions corresponding to the respective drive electrodes 4.

By arranging the plurality of proximity sense electrodes 7 at positions corresponding to the respective touch sense electrodes 5, a position of a stylus pen 21 as the RFID apparatus 9, which is in proximity, in the X direction on the touch panel 1a is detected. Then, by arranging the plurality of drive layer proximity sense electrodes 19 at positions corresponding to the respective drive electrodes 4, a position of the stylus pen 21 in the Y direction is detected. The stylus pen 21 has the coil 10 related to NFC. By arranging the plurality of proximity sense electrodes 7 at appropriate intervals in the X direction and arranging the plurality of drive layer proximity sense electrodes 19 at appropriate intervals in the Y direction, the stylus pen 21 having the coil 10 related to NFC is able to be accurately detected and is usable as an input apparatus.

Figure 11:
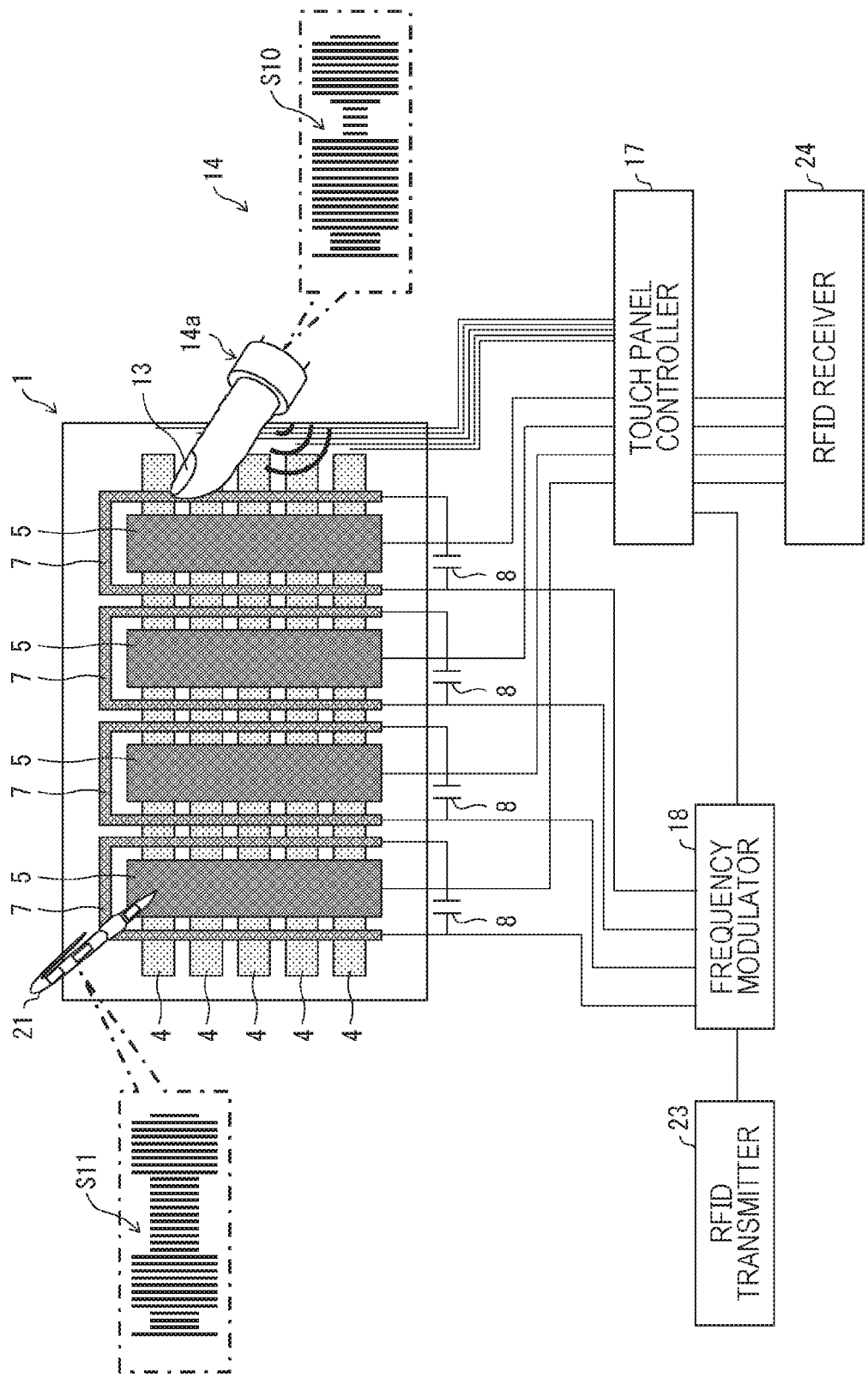
FIG. 11 is a schematic view illustrating a touch panel system provided with the touch panel.

FIG. 11 is a schematic view illustrating the touch panel system 14 provided with the touch panel 1. The touch panel 1 detects the finger 13 on which a ring 14a that has an NFC (Near Field Communication) function is worn, and the stylus pen 21 that has the NFC function. The ring 14a generates an RFID apparatus coil signal S10 which is coded. The stylus pen 21 generates an RFID apparatus coil signal S11 which is coded.

The touch panel system 14 has the touch panel controller 17 that applies drive voltages to the plurality of drive electrodes 4 and reads out linear sum signals from the plurality of touch sense electrodes 5, an RFID receiver 24 that is connected to the touch panel controller 17, the frequency modulator 18 that is connected to the plurality of proximity sense electrodes 7, and the RFID transmitter 23 that is connected to the frequency modulator 18.

With reference to FIGS. 5, 8, and 11, the touch panel controller 17 applies the drive voltage signals S1 to the plurality of drive electrodes 4 for the touch detection period T1. Next, the touch panel controller 17 reads out, along the plurality of touch sense electrodes 5, the linear sum signals S5 which are based on the drive voltage signals S1 applied to the drive electrodes 4 and are originated from charges of the plurality of capacitors. The touch panel controller 17 detects a touch position of an object touching the touch panel 1 on the basis of the linear sum signals S5 that are read out.

The touch panel controller 17 applies the touch panel transmitter signals S2 to the drive electrodes 4 for the RFID apparatus detection period T2. The RFID transmitter 23 generates RFID signals S7 on the order of megahertz and supplies the RFID signals S7 to the frequency modulator 18. The touch panel controller 17 generates drive signals S8 with a rectangular wave around 100 kHz and supplies the drive signals S8 to the frequency modulator 18. The frequency modulator 18 generates modulation signals S9 by superposing the RFID signals S7, which are supplied from the RFID transmitter 23, on the drive signals S8 which are supplied from the touch panel controller 17 and supplies the modulation signals S9 to the proximity sense electrodes 7.

Then, the ring 14a that generates the RFID apparatus coil signal S10 comes close to the proximity sense electrode 7, and the stylus pen 21 that generates the RFID apparatus coil signal S11 comes close to another proximity sense electrode 7.

Next, the touch panel controller 17 reads out, along the plurality of touch sense electrodes 5, the linear sum signals S6 which are based on the touch panel transmitter signals S2 applied to the drive electrodes 4 and the modulation signals S9 applied to the proximity sense electrodes 7, are originated from charges of the plurality of capacitors, and are affected by a change of a coupled charge between the touch sense electrode 5 and the proximity sense electrode 7 in which proximity sense electrode signal S4 flows due to proximity of the ring 14a or the stylus pen 21 to the touch panel 1, and supplies the linear sum signals S6 to the RFID receiver 24. After that, the RFID receiver 24 detects proximity of the ring 14a or the stylus pen 21 to the touch panel 1 and a position of the ring 14a or the stylus pen 21, which is in proximity, on the touch panel 1, on the basis of the linear sum signals S6 supplied from the touch panel controller 17.

Embodiment 3

Figure 12:
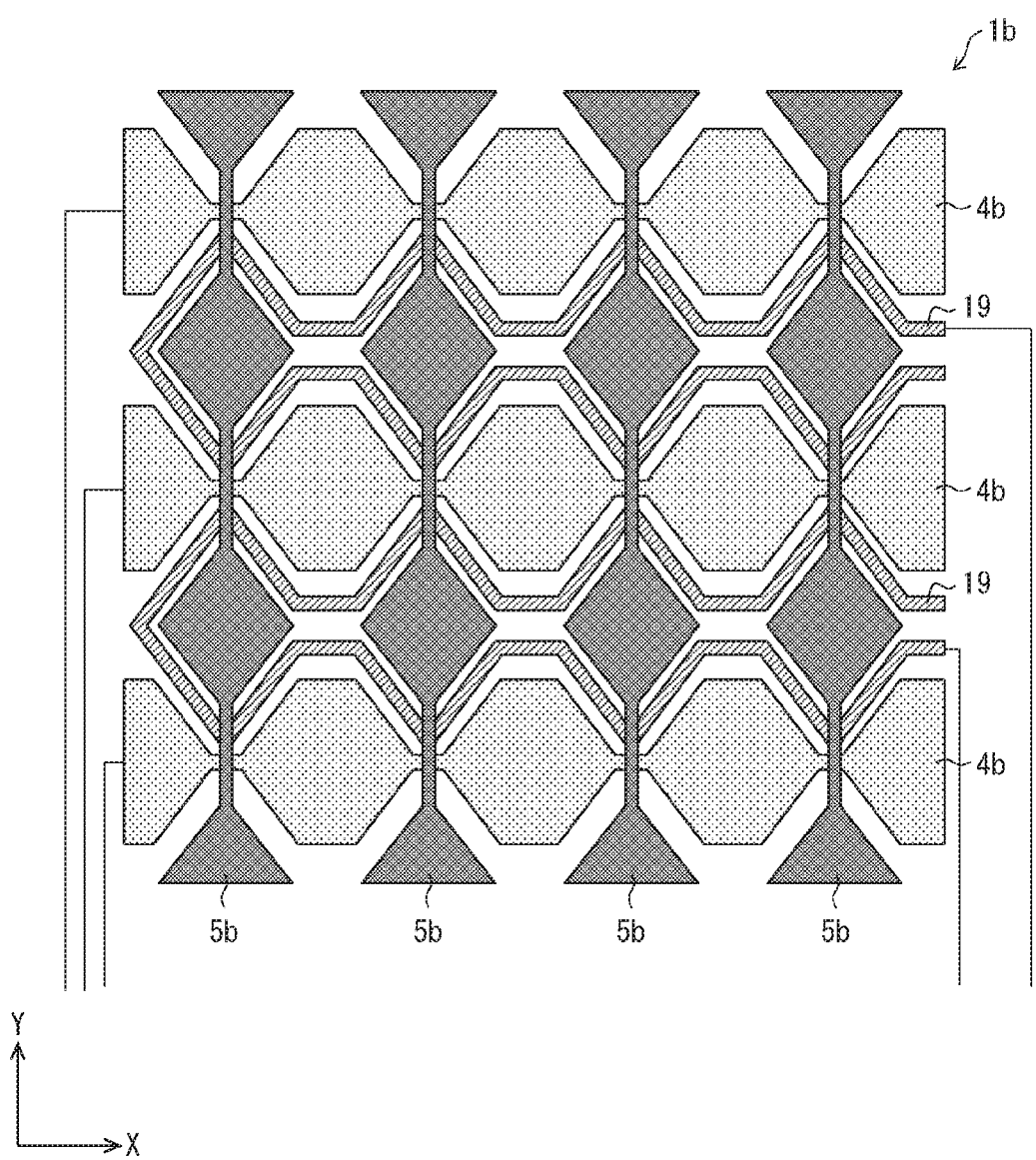
FIG. 12 is a front view illustrating a configuration of a touch panel according to Embodiment 3.

FIG. 12 is a front view illustrating a configuration of a touch panel 1b according to Embodiment 3. In the touch panel 1b, a plurality of drive electrodes 4b which are formed by repeating a pattern having a substantially hexagonal shape along the X direction are arranged in the drive layer 2 at fixed intervals in the Y direction. Then, a plurality of touch sense electrodes 5b which are formed by repeating a pattern having a substantially rhombic shape along the Y direction are arranged in the sense layer 3 at fixed intervals in the X direction.

The drive layer proximity sense electrode 19 is formed in the drive layer 2, which has a loop shape along the X direction, so as to surround substantially rhombic shaped patterns as parts of the touch sense electrodes 5b. In this manner, the electrode having the loop shape may be formed in the drive layer 2 other than the sense layer 3, and may be formed so as to surround parts of the touch sense electrodes 5b in the sense layer 3.

Embodiment 4

Figure 13:
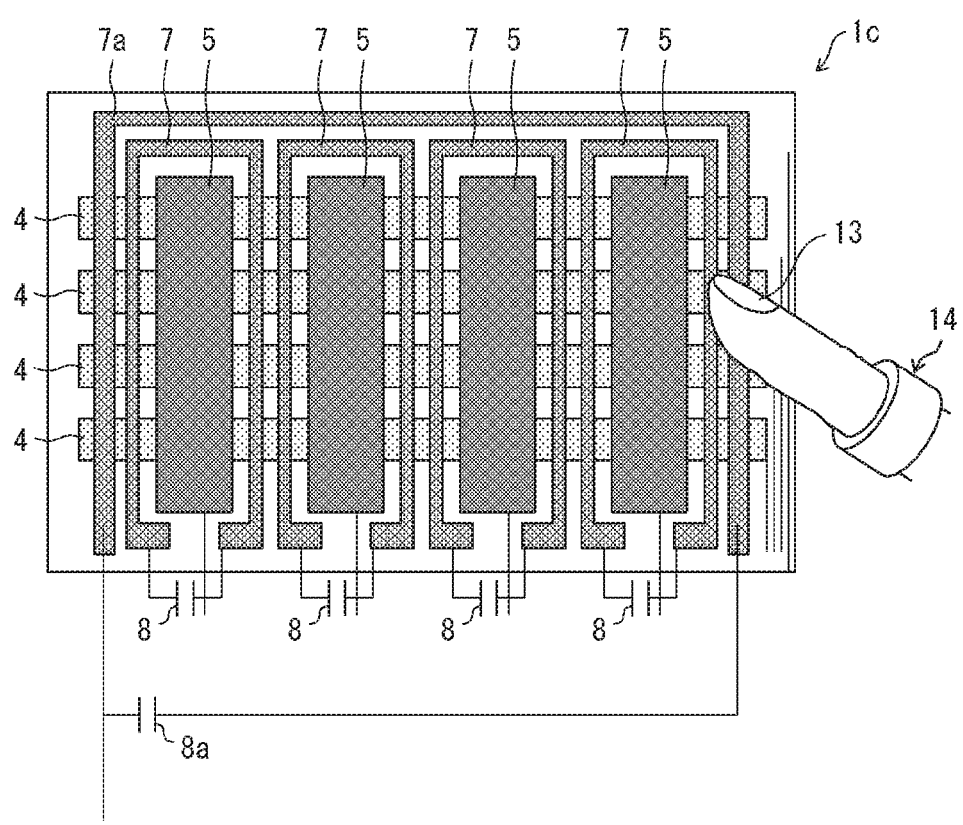
FIG. 13 is a front view illustrating a configuration of a touch panel according to Embodiment 4.

FIG. 13 is a front view illustrating a configuration of a touch panel 1c according to Embodiment 4. In the touch panel 1c, a proximity sense electrode 7a which is arranged in a U-shape so as to further surround the plurality of proximity sense electrodes 7 arranged so as to surround the respective touch sense electrodes 5 is provided. In order to define a resonance frequency of the proximity sense electrode 7a, a resonance frequency capacitor 8a that is connected to one end and the other end of the proximity sense electrode 7a is provided.

Figure 14:
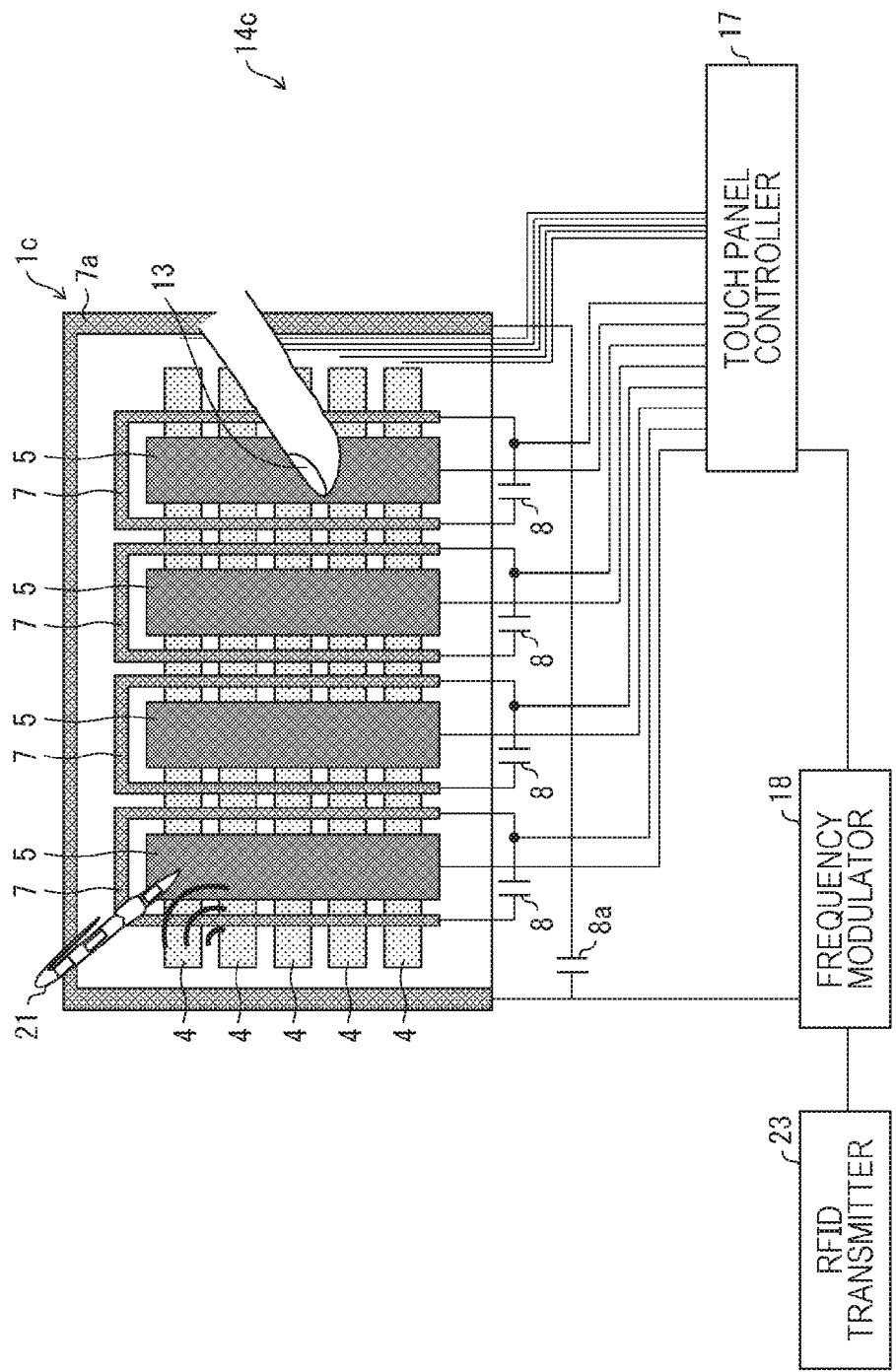
FIG. 14 is a schematic view illustrating a touch panel system provided with the touch panel.

FIG. 14 is a schematic view illustrating a touch panel system 14c provided with the touch panel 1c. The touch panel system 14c has the touch panel controller 17 that applies the drive voltage signals S1 to the plurality of drive electrodes 4 and reads out the linear sum signals S5 from the plurality of touch sense electrodes 5, the frequency modulator 18 that is connected to the proximity sense electrode 7a, and the RFID transmitter 23 that is connected to the frequency modulator 18.

The stylus pen 21 with a memory in which the RFID is embedded is detected by magnetic coupling. The finger 13 and the stylus pen 21 that is an RFID apparatus use different frequencies and are thus able to be identified. It is also possible to excellently exclude a palm placing area touched by a palm. Additionally, it is possible to detect proximity and a position of the RFID apparatus.

With reference to FIGS. 5, 8, and 14, the touch panel controller 17 applies the drive voltage signals S1 to the plurality of drive electrodes 4 for the touch detection period T1. Next, the touch panel controller 17 reads out, along the plurality of touch sense electrodes 5, the linear sum signals S5 which are based on the drive voltage signals S1 applied to the drive electrodes 4 and are originated from charges of the plurality of capacitors. The touch panel controller 17 detects, on the basis of the linear sum signals S5 that are read out, a touch position of the finger 13 that is an object touching the touch panel 1.

Then, the touch panel controller 17 applies the touch panel transmitter signals S2 to the drive electrodes 4 for the RFID apparatus detection period T2. The RFID transmitter 23 generates the RFID signal S7 on the order of megahertz and supplies the RFID signal S7 to the frequency modulator 18. The touch panel controller 17 generates the drive signal S8 with a rectangular wave around 100 kHz and supplies the drive signal S8 to the frequency modulator 18. The frequency modulator 18 generates the modulation signal S9 by superposing the RFID signal S7, which is supplied from the RFID transmitter 23, on the drive signal S8 which is supplied from the touch panel controller 17 and supplies the modulation signal S9 to the proximity sense electrode 7a.

After that, the touch panel controller 17 applies the touch panel transmitter signals S2 to the plurality of drive electrodes 4 for the RFID apparatus detection period T2. Next, when the stylus pen 21 comes close to the proximity sense electrode 7a of the touch panel 1c while radiating the coil signal S3, the touch panel controller 17 reads out, from each of the proximity sense electrodes 7, a signal based on a change of a coupled charge between the proximity sense electrode 7 and the proximity sense electrode 7a in which the proximity sense electrode signal S4 flows due to the proximity of the stylus pen 21. After that, on the basis of the signal read out from the proximity sense electrode 7, the touch panel controller 17 detects the proximity of the stylus pen 21 to the touch panel 1c and a position of the stylus pen 21, which is in proximity, on the touch panel 1c.

Embodiment 5

Figure 15:
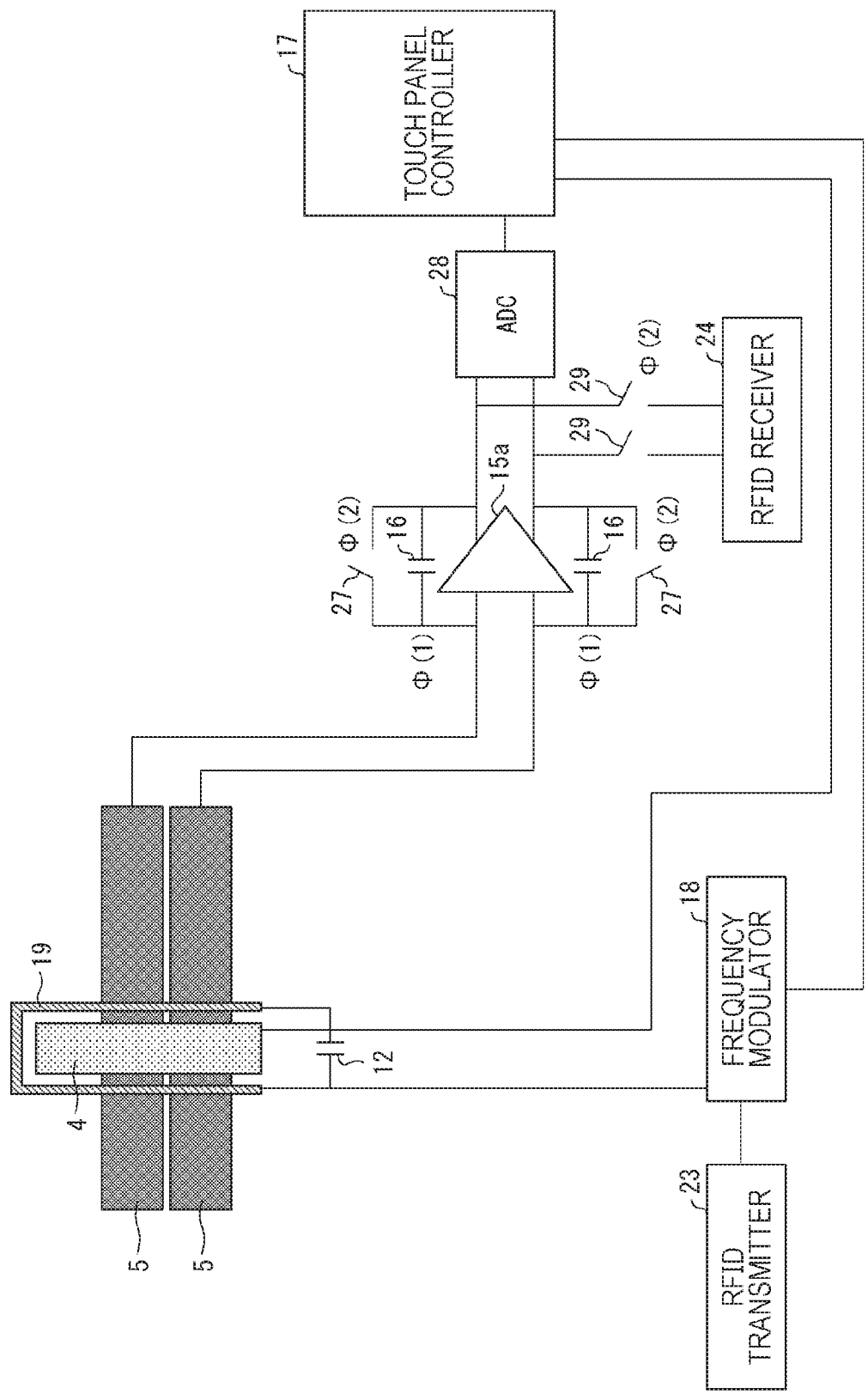
FIG. 15 is a schematic view illustrating a touch panel system according to Embodiment 5.

FIG. 15 is a schematic view illustrating a touch panel system according to Embodiment 5. Note that, for convenience of description, a member having the same function as that of the member already described will be given the same reference sign and description thereof will be omitted.

The drive layer proximity sense electrode 19 that is arranged in a U-shape so as to surround the drive electrode 4 is provided. The resonance frequency capacitor 12 by which the resonance frequency of the drive layer proximity sense electrode 19 is defined is provided at one end and the other end of the drive layer proximity sense electrode 19. The frequency modulator 18 is connected to the drive layer proximity sense electrode 19. The RFID transmitter 23 is connected to the frequency modulator 18.

A differential amplifier 15a is connected to the touch sense electrodes 5 that are adjacent to each other. An integral capacity 16 and a switch 27 are arranged in parallel to each other between one input and one output of the differential amplifier 15a. An integral capacity 16 and a switch 27 are arranged in parallel to each other between the other input and the other output of the differential amplifier 15a.

The outputs of the differential amplifier 15a are supplied to an ADC 28 and the RFID receiver 24. A pair of switches 29 is provided between the differential amplifier 15a and the RFID receiver 24.

The touch panel system according to Embodiment 5 has a touch detection mode $\phi(1)$ and an NFC detection mode $\phi(2)$. In the touch detection mode $\phi(1)$, the switches 27 and the switches 29 are turned off, and the touch panel controller 17 detects a position of an object performing a touch. In the NFC detection mode $\phi(2)$, the switches 27 and the switches 29 are turned on. Then, the touch panel controller 17 is reset, and the differential amplifier 15a is connected to an RFID receiver 24, and the RFID receiver 24 detects proximity of the RFID apparatus 9.

Embodiment 6

Figure 16:
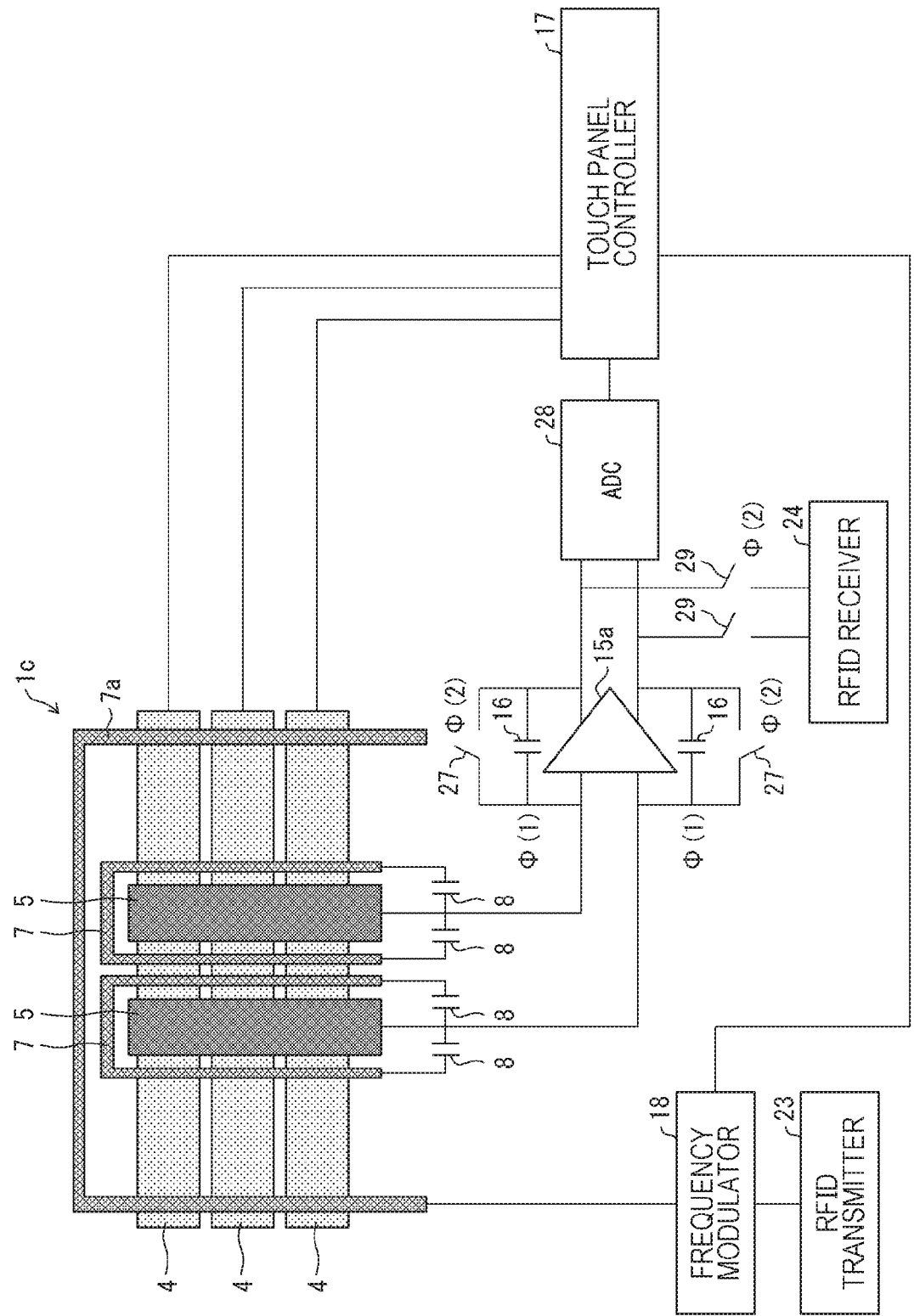
FIG. 16 is a schematic view illustrating a touch panel system according to Embodiment 6.

FIG. 16 is a schematic view illustrating a touch panel system according to Embodiment 6. Note that, for convenience of description, a member having the same function as that of the member already described will be given the same reference sign and description thereof will be omitted.

The plurality of proximity sense electrodes 7 are formed in a U-shape so as to surround the respective touch sense electrodes 5. The resonance frequency capacitor 8 by which the resonance frequency of each of the proximity sense electrodes 7 is defined is provided at one end and the other end of the proximity sense electrode 7.

The proximity sense electrode 7a is arranged in a U-shape so as to further surround the plurality of proximity sense electrodes 7. An NFC transmitter 25 is connected to the proximity sense electrode 7a.

The differential amplifier 15a is connected to the touch sense electrodes 5 that are adjacent to each other. An integral capacity 16 and a switch 27 are arranged in parallel to each other between one input and one output of the differential amplifier 15a. An integral capacity 16 and a switch 27 are arranged in parallel to each other between the other input and the other output of the differential amplifier 15a.

The outputs of the differential amplifier 15a are supplied to the ADC 28 and the NFC receiver 26. The pair of switches 29 is provided between the differential amplifier 15a and the NFC receiver 26. The touch panel controller 17 is connected to the ADC 28.

The NFC transmitter 25 operates in synchronization with the touch panel controller 17. The NFC receiver 26 operates for a reset period of the touch panel.

The touch panel system according to Embodiment 6 has the touch detection mode $\phi(1)$ and the NFC detection mode $\phi(2)$ similarly to Embodiment 5. In the touch detection mode $\phi(1)$, the switches 27 and the switches 29 are turned off, and the touch panel controller 17 detects a position of an object performing a touch. In the NFC detection mode $\phi(2)$, the switches 27 and the switches 29 are turned on. Then, the touch panel controller 17 is reset, and the differential amplifier 15a is connected to the NFC receiver 26, and the RFID receiver 24 detects proximity of the RFID apparatus 9.

Embodiment 7

Figure 17:
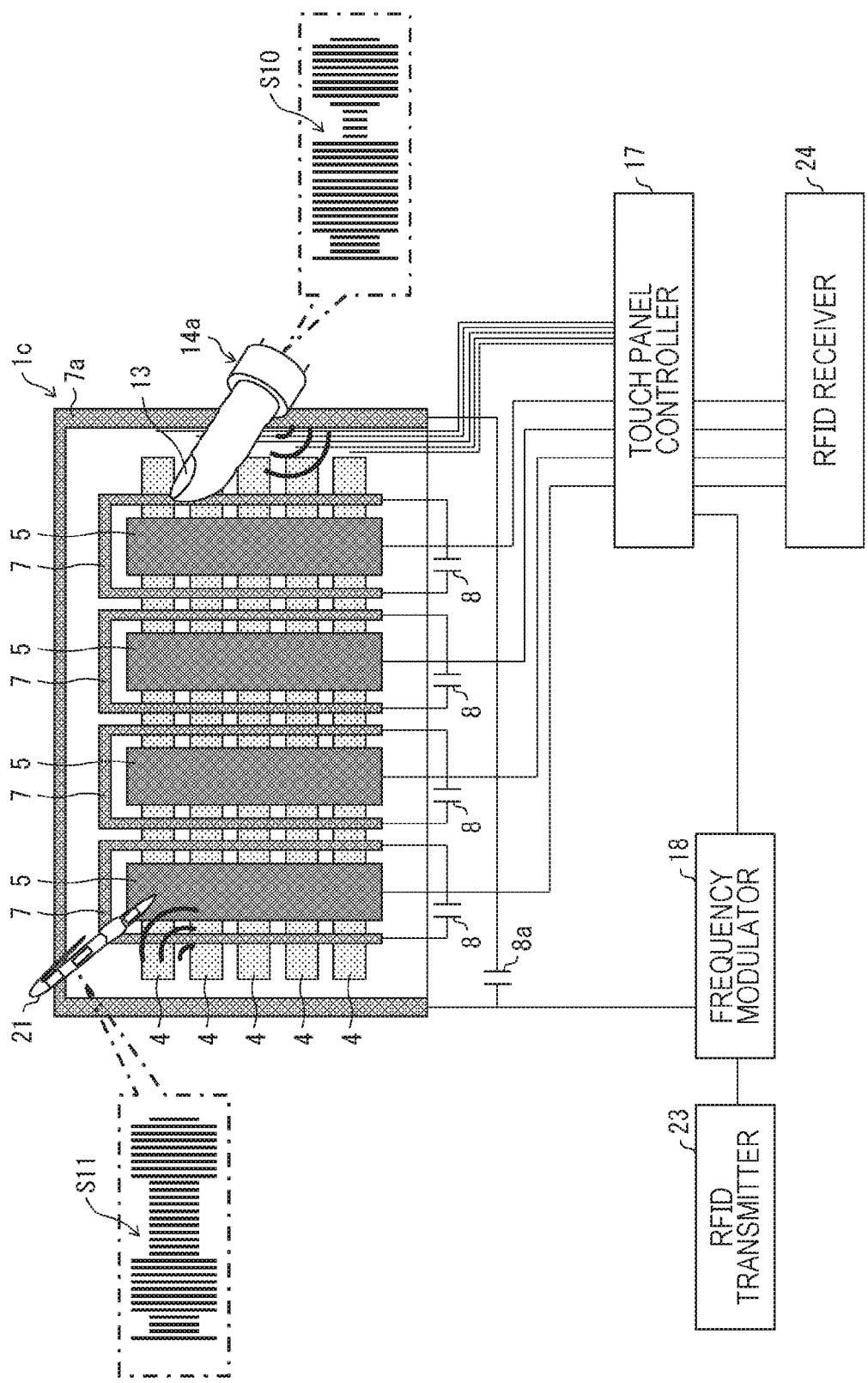
FIG. 17 is a schematic view illustrating a touch panel system according to Embodiment 7.

FIG. 17 is a schematic view illustrating a touch panel system according to Embodiment 7. Note that, for convenience of description, a member having the same function as that of the member already described will be given the same reference sign and description thereof will be omitted.

The RFID transmitter 23 is connected to the proximity sense electrode 7a provided in the touch panel 1c. The RFID receiver 24 is connected to the touch panel controller 17 that applies the drive voltage signals S1 to the plurality of drive electrodes 4, and reads out the linear sum signals S5 from the plurality of touch sense electrodes 5.

With reference to FIGS. 5, 8, and 17, the touch panel controller 17 applies the drive voltage signals S1 to the plurality of drive electrodes 4 for the touch detection period T1. Next, the touch panel controller 17 reads out, along the plurality of touch sense electrodes 5, the linear sum signals S5 which are based on the drive voltage signals S1 applied to the drive electrodes 4 and are originated from charges of the plurality of capacitors. The touch panel controller 17 detects a touch position of the finger 13 that is an object touching the touch panel 1, on the basis of the linear sum signals S5 that are read out.

The touch panel controller 17 applies the touch panel transmitter signals S2 to the plurality of drive electrodes 4 for the RFID apparatus detection period T2. The RFID transmitter 23 generates the RFID signal S7 on the order of megahertz and supplies the RFID signal S7 to the frequency modulator 18. The touch panel controller 17 generates the drive signal S8 with a rectangular wave around 100 kHz and supplies the drive signal S8 to the frequency modulator 18. The frequency modulator 18 generates the modulation signal S9 by superposing the RFID signal S7, which is supplied from the RFID transmitter 23, on the drive signal S8 which is supplied from the touch panel controller 17 and supplies the modulation signal S9 to the proximity sense electrode 7a.

Then, the ring 14a that generates the RFID apparatus coil signal S10 comes close to the proximity sense electrode 7, and the stylus pen 21 that generates the RFID apparatus coil signal S11 comes close to another proximity sense electrode 7.

Next, the touch panel controller 17 reads out, along the plurality of touch sense electrodes 5, the linear sum signals S6 which are based on the touch panel transmitter signals S2 applied to the drive electrodes 4 and the modulation signal S9 supplied to the proximity sense electrode 7a, are originated from charges of the plurality of capacitors, and are affected by changes of coupled charges between the touch sense electrodes 5 and the proximity sense electrodes 7 or a change of a coupled charge between the touch sense electrode 5 and the proximity sense electrode 7 or 7a in which the proximity sense electrode signal S4 flows due to proximity of the ring 14a or the stylus pen 21, and supplies the linear sum signals S6 to the RFID receiver 24. After that, the RFID receiver 24 detects proximity of the ring 14a or the stylus pen 21 to the touch panel 1 and detects a position of the ring 14a or the stylus pen 21, which is in proximity, on the touch panel 1, on the basis of the linear sum signals S6 supplied from the touch panel controller 17.

Embodiment 8

Figure 18:
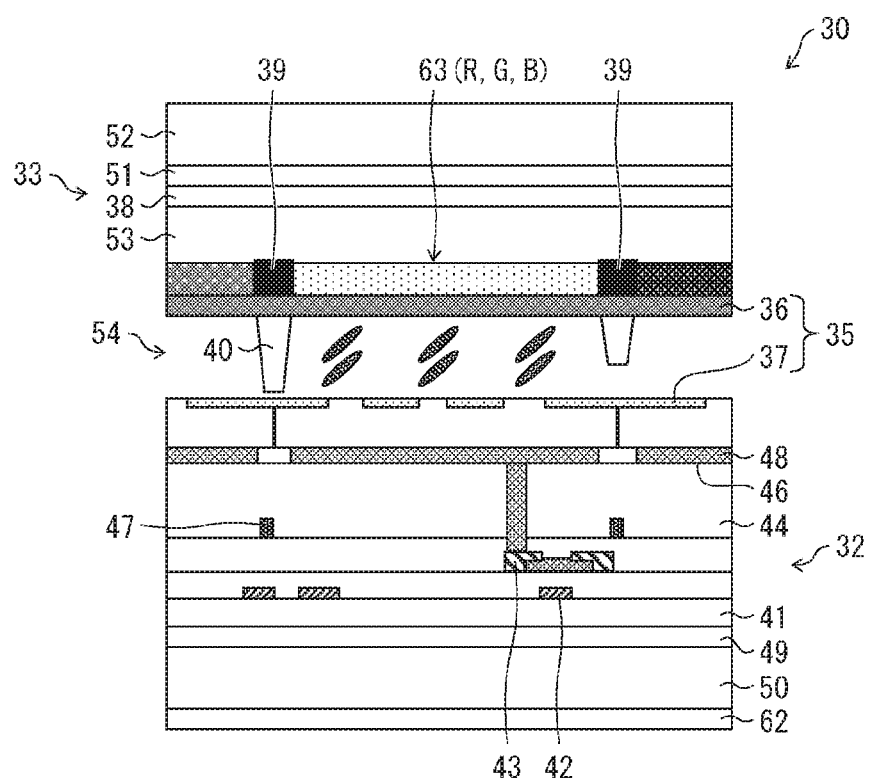
FIG. 18 is a sectional view illustrating a liquid crystal display panel in which a touch panel according to Embodiment 8 is built.

FIG. 18 is a sectional view illustrating a liquid crystal display panel 30 in which a touch panel according to Embodiment 8 is built. The liquid crystal display panel 30 includes a circuit substrate 32, a facing substrate 33 that is arranged facing the circuit substrate 32, and a liquid crystal layer 54 that is formed between the circuit substrate 32 and the facing substrate 33.

The circuit substrate 32 has a TFT (Thin Film Transistor) substrate 41. The TFT substrate 41 has a TFT gate line 42, a TFT source line 43, a TH layer 44, and a plurality of pixel electrodes 48, which are formed on the liquid crystal layer 54 side. A force shield metal 47 is provided in the TH layer 44. The TFT gate line 42, the TFT source line 43, and the TH layer 44 are provided for switching the pixel electrodes 48.

A deflection plate 49, a backlight unit 50, and an EMI layer 62 are formed on a side of the TFT substrate 41 which is opposite to the liquid crystal layer 54.

The facing substrate 33 has a CF (Color Filter) substrate 53. The CF substrate 53 has a color filter 63 and a black matrix 39 that are formed on the liquid crystal layer 54 side.

A pressure sensor 35 that detects pressure which is applied to the facing substrate 33 is provided in the liquid crystal display panel 30. The pressure sensor 35 has a drive electrode 36 that is formed on the black matrix 39 and a sense electrode 37 that is formed on the liquid crystal layer 54 side of the pixel electrodes 48. The sense electrode 37 is also used for a common electrode that is arranged in the TFT substrate 41 so as to form an electric field by which alignment of liquid crystal molecules included in the liquid crystal layer 54 is controlled.

The sense electrode 37 is connected to a force receiving wire 46 that is formed between the pixel electrodes 48 and the TH layer 44. The CF substrate 53 has a photo spacer 40 that is provided on the drive electrode 36 so as to protrude toward the liquid crystal layer 54 in order to keep a cell thickness of the liquid crystal layer 54.

A sense electrode 38 for the touch panel is provided on a side of the CF substrate 53, which is opposite to the liquid crystal layer 54. A deflection plate 51 and a cover glass 52 are formed above the sense electrode 38.

The liquid crystal panel 30 includes the touch panel that detects a touch to the facing substrate 33. The touch panel has the sense electrode 38 formed on the side of the CF substrate 53, which is opposite to the liquid crystal layer 54, to read out a signal based on an electrostatic capacity between the sense electrode 38 and the drive electrode 36. A drive electrode of the touch panel is also used for the drive electrode 36.

As described above, the touch panel according to the present embodiment is built in the liquid crystal display panel 30, and a drive layer in which the drive electrode 36 is formed and a sense layer in which the sense electrode 38 is formed are formed in the facing substrate 33. In the sense layer, a proximity sense electrode (not illustrated) that detects proximity of a coil is further formed. The proximity sense electrode is made from transparent ITO.

The sense electrode 38 may be arranged on a lower side of the black matrix 39, or may be arranged at a position where the proximity sense electrode is covered by the black matrix 39.

The drive layer and the sense layer may be formed in the circuit substrate 32. Moreover, one of the drive layer and the sense layer may be formed in the circuit substrate 32, and the other thereof may be formed in the facing substrate 33.

CONCLUSION

A touch panel 1, 1a, 1b, 1c according to an aspect 1 of the invention is the touch panel 1, 1a, 1b, 1c that includes a plurality of drive electrodes 4, 4b that are formed in a drive layer 2 along a first direction and a plurality of touch sense electrodes 5, 5b that are formed in a sense layer 3, which is insulated from the drive layer 2, along a second direction crossing the drive electrodes 4, 4b, in which a proximity sense electrode 7, 7a by which proximity of a coil 10 is detected is formed in the sense layer 3.

According to the aforementioned configuration, the proximity sense electrode by which the proximity of the coil is detected is provided in the touch panel for detecting a touch. Thus, the electrode for recognizing the proximity of the coil is provided in the touch panel that is an existing member, so that it is not necessary to additionally provide a new member for recognizing the proximity of the coil as in PTL 1. As a result, it is possible to realize the touch panel that is able to recognize the proximity of the coil, without increasing a material cost or a manufacturing cost.

In the touch panel 1, 1a, 1b, 1c according to an aspect 2 of the invention, in the aspect 1, the coil may be provided in an RFID apparatus.

According to the aforementioned configuration, proximity of the RFID apparatus is able to be detected.

In the touch panel 1, 1a, 1b, 1c according to an aspect 3 of the invention, in the aspect 1 or 2, the proximity sense electrode 7, 7a may be formed so as to have a resonance frequency of the coil 10.

According to the aforementioned configuration, the proximity sense electrode resonates with the coil due to the proximity of the coil. Thereby, a coupled charge between the proximity sense electrode and a touch sense electrode is changed. Accordingly, when linear sum signals that are read out along the plurality of touch sense electrodes change with the change of the coupled charge, the proximity of the coil is able to be detected.

In the touch panel 1, 1a, 1b, 1c according to an aspect 4 of the invention, in any one of the aspects 1 to 3, the proximity sense electrode 7, 7a may be arranged so as to surround corresponding one of the touch sense electrodes 5, 5b.

According to the aforementioned configuration, the proximity sense electrode that is arranged so as to surround the touch sense electrodes is electrostatically coupled with a touch sense electrode, and a change of induced current, which occurs in the proximity sense electrode due to the proximity of the coil, causes a change in current flowing through the touch sense electrode. Accordingly, by detecting current flowing through the touch sense electrodes is detected, the proximity of the coil is.

In the touch panel 1, 1a, 1b, 1c according to an aspect 5 of the invention, in any one of the aspects 1 to 4, the proximity sense electrode 7, 7a may be made from ITO (Indium Tin Oxide).

According to the aforementioned configuration, the proximity sense electrode is transparent, so that visibility in display of a display apparatus that corresponds to the touch panel is improved.

The touch panel 1, 1a, 1b, 1c according to an aspect 6, in any one of the aspects 1 to 5, may further include a resonance frequency capacitor 8, 8a that is connected to one end and the other end of the proximity sense electrode 7, 7a in order to define a resonance frequency of the proximity sense electrode 7, 7a, in which the proximity sense electrode 7, 7a may have a U-shape.

According to the aforementioned configuration, the resonance frequency of the proximity sense electrode that resonates the coil is able to be defined by an electrostatic capacity of a resonance frequency capacitor.

In the touch panel 1, 1a, 1b, 1c according to an aspect 7 of the invention, in any one of the aspects 1 to 6, a plurality of proximity sense electrodes 7 by which proximity of the coil 10 is detected may be formed, and the plurality of proximity sense electrodes 7 may be arranged at positions corresponding to the respective touch sense electrodes 5.

According to the aforementioned configuration, it is possible to detect a position of the coil, which is in proximity to the touch panel, in a direction perpendicular to the touch sense electrodes.

The touch panel 1a, 1b according to an aspect 8 of the invention may further include a plurality of drive layer proximity sense electrodes 19 that are formed in the drive layer 2 so as to have a resonance frequency of the coil 10 in order to detect the proximity of the coil 10, in which the plurality of drive layer proximity sense electrodes 19 may be arranged at positions corresponding to the respective drive electrode 4b, in any one of the aspects 1 to 6.

According to the aforementioned configuration, it is possible to detect a position of the coil, which is in proximity to the touch panel, in a direction perpendicular to the drive electrodes.

In the touch panel 1, 1a, 1b, 1c according to an aspect 9 of the invention, in any one of the aspects 1 to 6, drive voltages may be applied to the plurality of drive electrodes 4, 4b for a touch detection period T1 in which a touch to the touch panel 1, 1a, 1b, 1c is detected, and linear sum signals which are based on the drive voltages applied to the drive electrodes 4, 4b and are originated from charges of a plurality of capacitors may be read out along the plurality of touch sense electrodes 5, 5b, and coil detection voltages (touch panel transmitter signals S2) may be applied to the plurality of drive electrodes 4, 4b for a coil detection period T2 in which proximity of the coil 10 is detected, and linear sum signals S6 which are based on the coil detection voltages (touch panel transmitter signals S2) applied to the drive electrodes 4, 4b, and are originated from charges of the plurality of capacitors may be read out along the plurality of touch sense electrodes 5 when the linear sum signals S6 are affected by a change of a coupled charge between the proximity sense electrode 7 and corresponding one of the touch sense electrodes 5 due to the proximity of the coil 10.

According to the aforementioned configuration, it is possible to detect a touch for the touch detection period and detect proximity of the coil for the coil detection period.

In the touch panel 1, 1a, 1b, 1c according to an aspect 10 of the invention, in any one of the aspects 1 to 9, the touch panel 1, 1a, 1b, 1c may be built in a liquid crystal display panel 30, the liquid crystal display panel 30 may have a circuit substrate 32, a facing substrate 33 that is arranged facing the circuit substrate 32, and a liquid crystal layer 54 that is formed between the circuit substrate 32 and the facing substrate 33, and the drive layer 2 and the sense layer 3 may be formed in the circuit substrate 32.

According to the aforementioned configuration, it is possible to build the touch panel in the circuit substrate of the liquid crystal display panel.

In the touch panel 1, 1a, 1b, 1c according to an aspect 11 of the invention, in any one of the aspects 1 to 9, the touch panel 1, 1a, 1b, 1c may be built in a liquid crystal display panel 30, the liquid crystal display panel 30 may have a circuit substrate 32, a facing substrate 33 that is arranged facing the circuit substrate 32, and a liquid crystal layer 54 that is formed between the circuit substrate 32 and the facing substrate 33, the drive layer 2 may be formed in one of the circuit substrate 32 and the facing substrate 33, and the sense layer 3 may be formed in the other of the circuit substrate 32 and the facing substrate 33.

According to the aforementioned configuration, it is possible to build the touch panel in the circuit substrate and the facing substrate of the liquid crystal display panel.

In the touch panel 1, 1a, 1b, 1c according to an aspect 12 of the invention, in any one of the aspects 1 to 9, the touch panel 1, 1a, 1b, 1c may be built in a liquid crystal display panel 30, the liquid crystal display panel 30 may have a circuit substrate 32, a facing substrate 33 that is arranged facing the circuit substrate 32, and a liquid crystal layer 54 that is formed between the circuit substrate 32 and the facing substrate 33, and the drive layer 2 and the sense layer 3 may be formed in the facing substrate 33.

According to the aforementioned configuration, it is possible to build the touch panel in the facing substrate of the liquid crystal display panel.

In the touch panel 1, 1a, 1b, 1c according to an aspect 13 of the invention, in any one of the aspects 1 to 12, the coil 10 may be provided in a stylus pen 21 by which information is input to the touch panel 1, 1a, 1b, 1c.

According to the aforementioned configuration, it is possible to detect proximity of the pen provided with the coil.

A touch panel system 14 according to an aspect 14 of the invention is the touch panel system 14 which includes: the touch panel 1, 1a, 1b, 1c according to any one of the aspects 1 to 13 of the invention; and a controller (touch panel controller 17) that controls the touch panel 1, 1a, 1b, 1c, and in which the controller (touch panel controller 17) includes: a drive circuit 17a that applies drive voltages (drive voltage signals S1) to the plurality of drive electrodes 4, 4b for a touch detection period T1 in which a touch to the touch panel 1, 1a, 1b, 1c is detected and that applies coil detection voltages (touch panel transmitter signals S2) to the plurality of drive electrodes 4, 4b for a coil detection period (RFID apparatus detection period T2) in which proximity of the coil 10 is detected; and a detection circuit 17b that detects a touch position for the touch detection period by reading out, along the plurality of touch sense electrodes 5, linear sum signals S5 which are based on the drive voltages (drive voltage signals S1) applied to the drive electrodes 4, 4b and are originated from charges of a plurality of capacitors, and that detects proximity of the coil 10 for the coil detection period (RFID apparatus detection period T2) by reading out, along the plurality of touch sense electrodes 5, linear sum signals S6 which are based on the coil detection voltages (the touch panel transmitter signals S2) applied to the drive electrodes 4, 4b, are originated from charges of the plurality of capacitors, and are affected by a change of a coupled charge between the proximity sense electrode 7, 7a and corresponding one of the touch sense electrodes 5 due to the proximity of the coil 10, and a frequency modulator 18 that receives, from the proximity sense electrode 7, 7a, a signal based on a resonance frequency of the coil 10, modulates a frequency of the signal and supplies the resultant to an RFID transmitter/receiver 22 or the controller (touch panel controller 17) is further included.

The invention is not limited to each of embodiments described above and may be modified in various manners within the scope of the claims, and an embodiment achieved by appropriately combining technical means disclosed in each of different embodiments is also encompassed in the technical scope of the invention. Further, by combining the technical means disclosed in each of different embodiments, a new technical feature may be formed.

REFERENCE SIGNS LIST

1 touch panel
2 drive layer
3 sense layer
4 drive electrode
5 touch sense electrode
7, 7a proximity sense electrode
8, 8a resonance frequency capacitor
9 RFID apparatus
10 coil
12 resonance frequency capacitor
14 touch panel system
17 touch panel controller (controller)
18 frequency modulator
19 drive layer proximity sense electrode
21 stylus pen
30 liquid crystal display panel
32 circuit substrate
33 facing substrate
54 liquid crystal layer
S1 drive voltage signal (drive voltage)
S2 touch panel transmitter signal (coil detection voltage)
S3 coil signal
S4 proximity sense electrode signal
S5, S6 linear sum signal
T1 touch detection period
T2 RFID apparatus detection period (coil detection period)

The invention claimed is:

1. A touch panel comprising:
a plurality of drive electrodes that are in a drive layer along a first direction; and
a plurality of touch sense electrodes that are in a sense layer, which is insulated from the drive layer, along a second direction crossing the plurality of drive electrodes, wherein a plurality of first proximity sense electrodes by each of which proximity of a coil is detected are provided in the sense layer to correspond to the plurality of touch sense electrodes, respectively,
the plurality of first proximity sense electrodes are each arranged to surround a corresponding one of the plurality of touch sense electrodes,
a second proximity sense electrode is arranged to surround the plurality of first proximity sense electrodes,
drive voltages are applied to the plurality of drive electrodes for a touch detection period in which a touch to the touch panel is detected, and linear sum signals which are based on the drive voltages applied to the drive electrodes and are originated from charges of a plurality of capacitors are read out along the plurality of touch sense electrodes, and
coil detection voltages are applied to the plurality of drive electrodes for a coil detection period in which the proximity of the coil is detected, and linear sum signals which are based on the coil detection voltages applied to the plurality of drive electrodes and are originated from charges of the plurality of capacitors, are read out along the plurality of touch sense electrodes when the linear sum signals are affected by a change of a coupled charge between each of the plurality of first proximity sense electrodes and corresponding one of the plurality of touch sense electrodes due to the proximity of the coil.

2. The touch panel according to claim 1, wherein the coil is provided in an RFID apparatus.

3. The touch panel according to claim 1, wherein the plurality of first proximity sense electrodes each have a resonance frequency of the coil.

4. The touch panel according to claim 1, wherein the plurality of first proximity sense electrodes are made from ITO (Indium Tin Oxide).

5. The touch panel according to claim 1, further comprising a plurality of resonance frequency capacitors that are each connected to one end and the other end of a corresponding one of the plurality of first proximity sense electrodes to define a resonance frequency of the each of the plurality of first proximity sense electrodes, wherein
each of the plurality of first proximity sense electrodes has a U-shape.

6. The touch panel according to claim 1, further comprising a plurality of drive layer proximity sense electrodes that are in the drive layer to have a resonance frequency of the coil in order to detect the proximity of the coil, wherein
the plurality of drive layer proximity sense electrodes are arranged at positions corresponding to the respective plurality of drive electrodes.

7. The touch panel according to claim 1, wherein
the touch panel is built in a liquid crystal display panel,
the liquid crystal display panel includes a circuit substrate, a facing substrate that is arranged opposing the circuit substrate, and a liquid crystal layer that is between the circuit substrate and the facing substrate, and
the drive layer and the sense layer are in the circuit substrate.

8. The touch panel according to claim 1, wherein
the touch panel is built in a liquid crystal display panel,
the liquid crystal display panel includes a circuit substrate, a facing substrate that is arranged facing the circuit substrate, and a liquid crystal layer that is between the circuit substrate and the facing substrate,
the drive layer is in one of the circuit substrate and the facing substrate, and
the sense layer is in the other of the circuit substrate and the facing substrate.

9. The touch panel according to claim 1, wherein
the touch panel is built in a liquid crystal display panel,
the liquid crystal display panel includes a circuit substrate, a facing substrate that is arranged facing the circuit substrate, and a liquid crystal layer that is between the circuit substrate and the facing substrate, and
the drive layer and the sense layer are in the facing substrate.

10. The touch panel according to claim 1, wherein the coil is provided in a stylus pen by which information is input to the touch panel.

11. A touch panel system comprising:
the touch panel according to claim 1; and
a controller that controls the touch panel, wherein the controller includes:
- a drive circuit that applies drive voltages to the plurality of drive electrodes for a touch detection period in which a touch to the touch panel is detected and that applies coil detection voltages to the plurality of drive electrodes for a coil detection period in which the proximity of the coil is detected, and
- a detection circuit that detects a touch position for the touch detection period by reading out, along the plurality of touch sense electrodes, linear sum signals which are based on the drive voltages applied to the plurality of drive electrodes and are originated from charges of a plurality of capacitors, and that detects the proximity of the coil for the coil detection period by reading out, along the plurality of touch sense electrodes, linear sum signals which are based on the coil detection voltages applied to the plurality of drive electrodes, are originated from charges of the plurality of capacitors, and are affected by a change of a coupled charge between each of the plurality of first proximity sense electrodes and a corresponding one of the plurality of touch sense electrodes due to the proximity of the coil, and
- a frequency modulator that receives, from each of the first proximity sense electrodes, a signal based on a resonance frequency of the coil, modulates a frequency of the signal, and supplies the resultant to an RFID transmitter/receiver or the controller.

12. A touch panel comprising:
a plurality of drive electrodes that are in a drive layer along a first direction; and
a plurality of touch sense electrodes that are in a sense layer, which is insulated from the drive layer, along a second direction crossing the plurality of drive electrodes, wherein
a proximity sense electrode by which proximity of a coil is detected is provided in the sense layer,
drive voltages are applied to the plurality of drive electrodes for a touch detection period in which a touch to the touch panel is detected, and linear sum signals that are based on the drive voltages applied to the plurality of drive electrodes and are originated from charges of a plurality of capacitors are read out along the plurality of touch sense electrodes, and
coil detection voltages are applied to the plurality of drive electrodes for a coil detection period in which the proximity of the coil is detected, and linear sum signals that are based on the coil detection voltages applied to the plurality of drive electrodes and are originated from the charges of the plurality of capacitors, are read out along the plurality of touch sense electrodes when the linear sum signals are affected by a change of a coupled charge between the proximity sense electrode and a corresponding one of the plurality of touch sense electrodes due to the proximity of the coil.

13. The touch panel according to claim 12, wherein the coil is provided in an RFID apparatus.

14. The touch panel according to claim 12, wherein the proximity sense electrode has a resonance frequency of the coil.

15. The touch panel according to claim 12, wherein the proximity sense electrode is made from ITO (Indium Tin Oxide).

16. The touch panel according to claim 12, further comprising a resonance frequency capacitor that is connected to one end and another end of the proximity sense electrode to define a resonance frequency of the proximity sense electrode, wherein
the proximity sense electrodes has a U-shape.

17. The touch panel according to claim 12, further comprising a plurality of drive layer proximity sense electrodes that are in the drive layer to have a resonance frequency of the coil in order to detect the proximity of the coil, wherein
the plurality of drive layer proximity sense electrodes are arranged at positions corresponding to the respective plurality of drive electrodes.

18. The touch panel according to claim 12, wherein
the touch panel is built in a liquid crystal display panel,
the liquid crystal display panel includes a circuit substrate, a facing substrate that is arranged opposing the circuit substrate, and a liquid crystal layer that is between the circuit substrate and the facing substrate, and
the drive layer and the sense layer are in the circuit substrate.

19. The touch panel according to claim 12, wherein
the touch panel is built in a liquid crystal display panel,
the liquid crystal display panel includes a circuit substrate, a facing substrate that is arranged facing the circuit substrate, and a liquid crystal layer that is between the circuit substrate and the facing substrate,
the drive layer is in one of the circuit substrate and the facing substrate, and
the sense layer is in the other of the circuit substrate and the facing substrate.

20. The touch panel according to claim 12, wherein
the touch panel is built in a liquid crystal display panel,
the liquid crystal display panel includes a circuit substrate, a facing substrate that is arranged facing the circuit substrate, and a liquid crystal layer that is between the circuit substrate and the facing substrate, and
the drive layer and the sense layer are in the facing substrate.

21. The touch panel according to claim 12, wherein the coil is provided in a stylus pen by which information is input to the touch panel.

22. A touch panel system comprising:
a touch panel including:
- a plurality of drive electrodes that are in a drive layer along a first direction; and
- a plurality of touch sense electrodes that are in a sense layer, which is insulated from the drive layer, along a second direction crossing the plurality of drive electrodes, wherein a proximity sense electrode by each of which proximity of a coil is detected is provided in the sense layer, and a controller that controls the touch panel, wherein
the controller includes:
- a drive circuit that applies drive voltages to the plurality of drive electrodes for a touch detection period in which a touch to the touch panel is detected and that applies coil detection voltages to the plurality of drive electrodes for a coil detection period in which the proximity of the coil is detected, and
- a detection circuit that detects a touch position for the touch detection period by reading out, along the plurality of touch sense electrodes, linear sum signals that are based on the drive voltages applied to the plurality of drive electrodes and are originated from charges of a plurality of capacitors, and that detects the proximity of the coil for the coil detection period by reading out, along the plurality of touch sense electrodes, linear sum signals that are based on the coil detection voltages applied to the drive plurality of electrodes, are originated from the charges of the plurality of capacitors, and are affected by a change of a coupled charge between the proximity sense electrode and a corresponding one of the plurality of touch sense electrodes due to the proximity of the coil, and a frequency modulator that receives, from the proximity sense electrode, a signal based on a resonance frequency of the coil, modulates a frequency of the signal, and supplies the resultant to an RFID transmitter/receiver or the controller.

* * * * *